(12) United States Patent
Maruyama et al.

(10) Patent No.: US 11,290,263 B2
(45) Date of Patent: Mar. 29, 2022

(54) INFORMATION PROCESSING APPARATUS AND INFORMATION PROCESSING METHOD

(71) Applicant: SONY CORPORATION, Tokyo (JP)

(72) Inventors: Shinya Maruyama, Kanagawa (JP); Yuichi Kageyama, Tokyo (JP); Mana Miyakoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 103 days.

(21) Appl. No.: 16/633,722

(22) PCT Filed: May 8, 2018

(86) PCT No.: PCT/JP2018/017805
§ 371 (c)(1),
(2) Date: Jan. 24, 2020

(87) PCT Pub. No.: WO2019/026372
PCT Pub. Date: Feb. 7, 2019

(65) Prior Publication Data
US 2020/0213098 A1 Jul. 2, 2020

(30) Foreign Application Priority Data
Aug. 4, 2017 (JP) .............................. JP2017-151380

(51) Int. Cl.
| H04L 29/06 | (2006.01) |
| H04L 9/08 | (2006.01) |
| H04L 9/14 | (2006.01) |

(52) U.S. Cl.
CPC ................ *H04L 9/085* (2013.01); *H04L 9/14* (2013.01)

(58) Field of Classification Search
None
See application file for complete search history.

(56) References Cited

U.S. PATENT DOCUMENTS 6,792,541 B1 * 9/2004 Kusakabe ........ G06Q 20/35765
726/1
7,003,671 B1 * 2/2006 Kusakabe .......... G06Q 20/3558
713/189

(Continued)

FOREIGN PATENT DOCUMENTS

| JP | 10-198272 A | 7/1998 |
| JP | 2008-219177 A | 9/2008 |

(Continued)

OTHER PUBLICATIONS

"A Secret Sharing Engine for Safely Protecting Confidential Information", NTT Communications, vol. 17, No. 2, 2005, pp. 38-41.

(Continued)

*Primary Examiner* — Maung T Lwin
(74) *Attorney, Agent, or Firm* — Chip Law Group

(57) ABSTRACT

Provided is a technology for performing flexible access control to permit decoding of secret information exclusively with a specific user in a case where secret splitting is hierarchically executed. There is provided an information processing apparatus including a control unit that generates, from a first key with which first data is decodable, a plurality of shares based on the first key in response to a first-key generation request, restores the first key from the shares based on the first key in response to a second-key generation request, encrypts, with the first key, a part of a plurality of shares based on a part or all of the first key as a second key with which second data is decodable, and generates a plurality of shares based on the second key.

20 Claims, 17 Drawing Sheets

(56) References Cited

U.S. PATENT DOCUMENTS

| | | | |
|---|---|---|---|
| 7,978,856 B2* | 7/2011 | Cho | H04L 63/065 380/277 |
| 8,180,059 B2* | 5/2012 | Nakano | H04L 9/0836 380/277 |
| 2011/0099362 A1* | 4/2011 | Haga | H04L 9/0822 713/2 |
| 2011/0185437 A1* | 7/2011 | Tran | H04L 63/104 726/28 |
| 2012/0011360 A1* | 1/2012 | Engels | H04L 9/083 713/166 |
| 2013/0007455 A1* | 1/2013 | Jaber | H04L 9/0819 713/171 |
| 2013/0040629 A1* | 2/2013 | Sprigg | H04N 21/6181 455/419 |
| 2014/0096180 A1* | 4/2014 | Negi | H04L 63/08 726/1 |
| 2014/0123320 A1* | 5/2014 | Isozaki | G06F 21/44 726/29 |
| 2016/0099922 A1* | 4/2016 | Dover | H04L 9/3236 713/171 |

FOREIGN PATENT DOCUMENTS

| | | |
|---|---|---|
| JP | 2009-103774 A | 5/2009 |
| JP | 2011-010170 A | 1/2011 |

OTHER PUBLICATIONS

International Search Report and Written Opinion of PCT Application No. PCT/JP2018/017805, dated Jul. 17, 2018, 08 pages of ISRWO.

"Secret Sharing Engine for Secure Protection of Confidential Information", NTT Communications, NTT Technical Review, vol. 17, No. 2, Feb. 1, 2005, pp. 38-41.

* cited by examiner

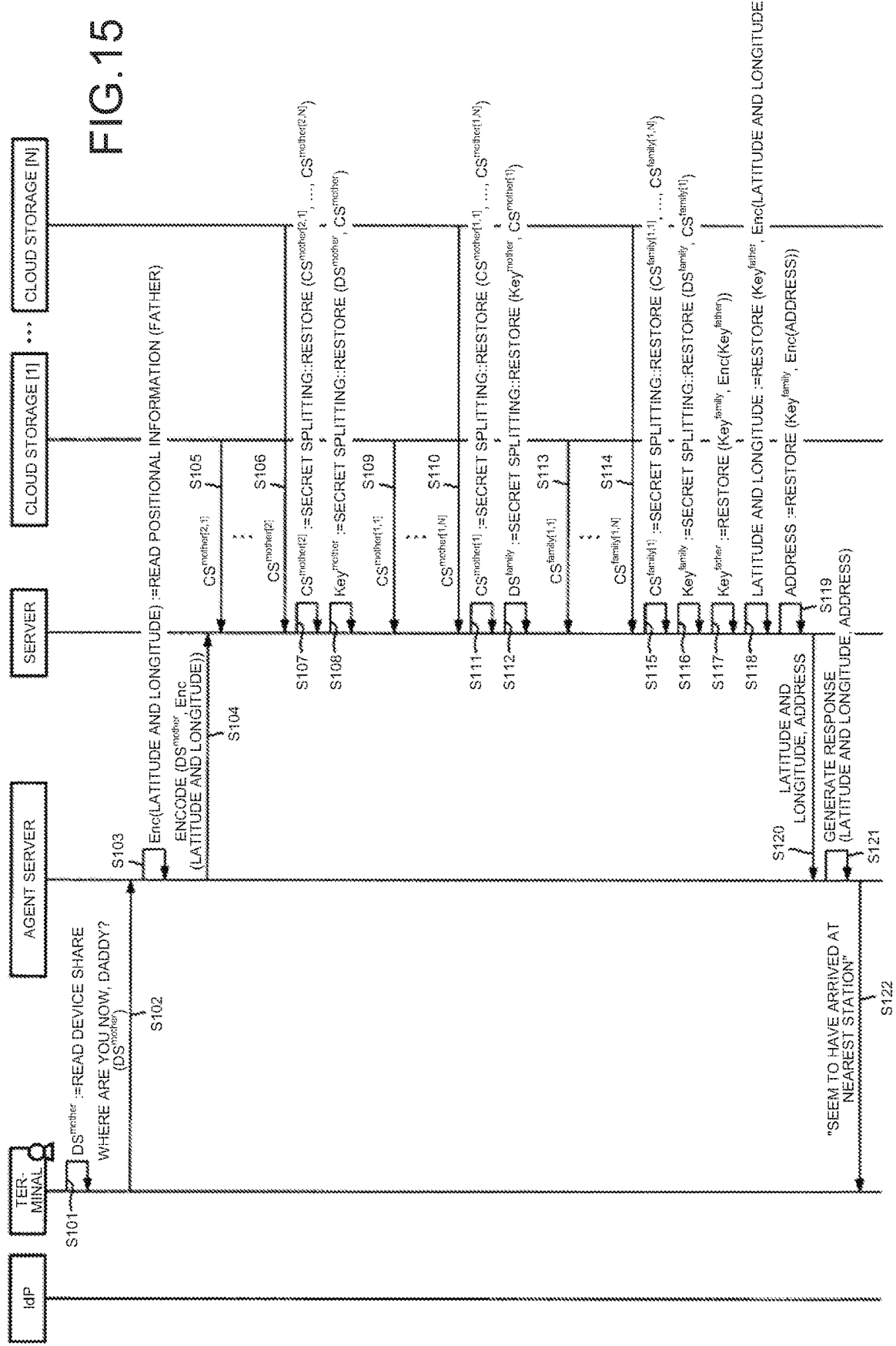

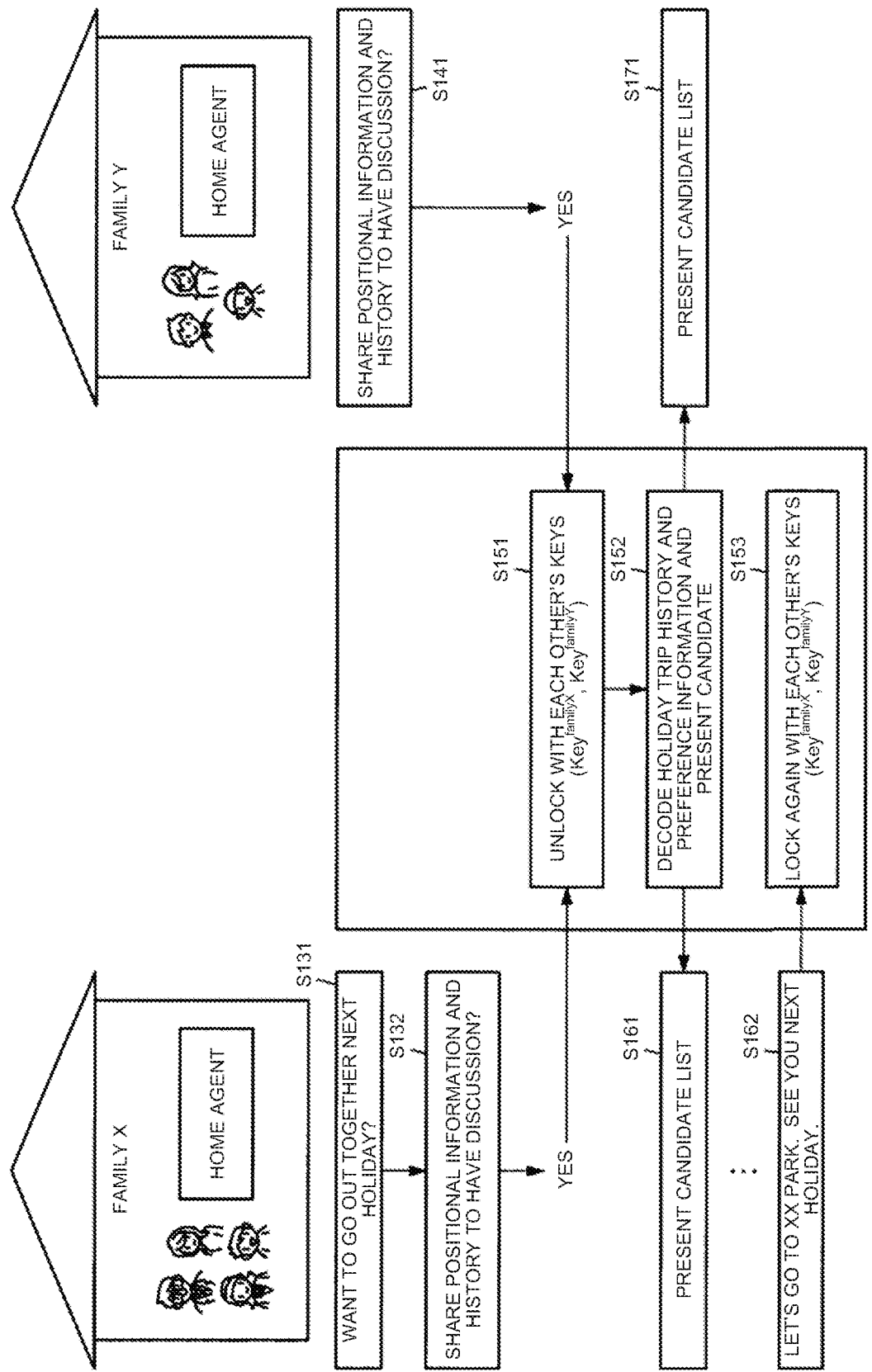

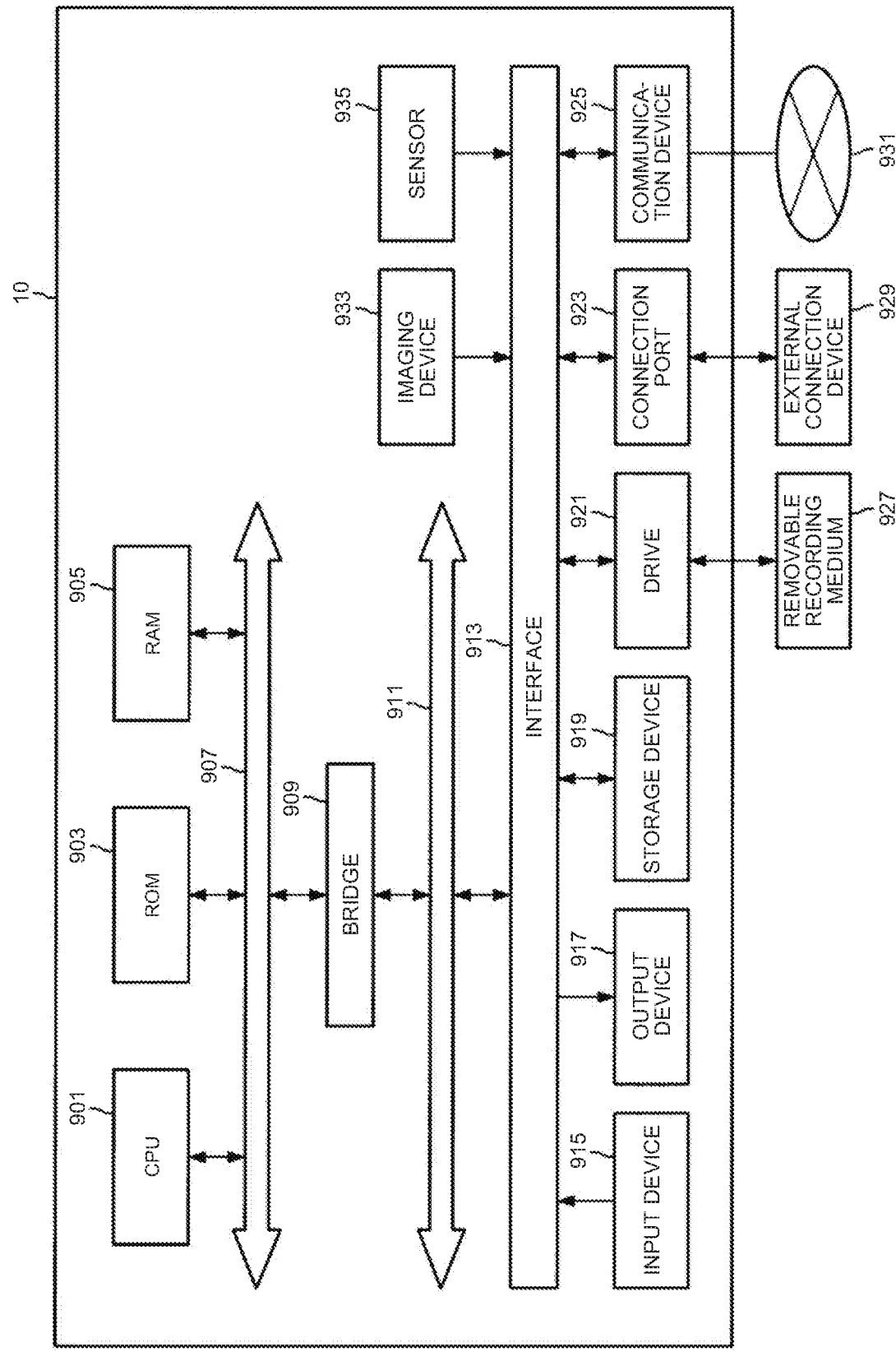

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/017805 filed on May 8, 2018, which claims priority benefit of Japanese Patent Application No. JP 2017-151380 filed in the Japan Patent Office on Aug. 4, 2017. Each of the above-referenced applications is hereby incorporated herein by reference in its entirety.

FIELD

The present disclosure relates to an information processing apparatus, an information processing method, and a program.

BACKGROUND

In recent years, there has been a technology for splitting a key by using secret splitting. For example, there is a disclosed technology in which a key is split due to the secret splitting, each of a plurality of sets of information obtained due to the splitting is assigned to the corresponding user, the key is derived when the agreement with a predetermined number of users is obtained in accordance with the secret splitting technique, and a signature is provided or decoding is executed by using the key (for example, see Patent Literature 1). Furthermore, as the secret splitting is hierarchially executed, it is possible to process the above-described key in multiple layers.

CITATION LIST

Patent Literature

Patent Literature 1: JP H10-198272 A

SUMMARY

Technical Problem

However, as it is difficult to derive the key unless the agreement with the predetermined number of users is obtained, there may be a case where, even though secret information is accessible by a certain user, the access is not allowed without the agreement with the other users. Furthermore, there may be a case where, as it is possible to derive the key if the agreement with the predetermined number of users is obtained, the information regarding the privacy of a certain user may be accessed without the agreement with the certain user. Therefore, in a case where the secret splitting is hierarchially executed, it is desirable to provide a technology for performing the flexible access control to permit the decoding of secret information exclusively with a specific user.

Solution to Problem

According to the present disclosure, an information processing apparatus is provided that includes: a control unit that generates, from a first key with which first data is decodable, a plurality of shares based on the first key in response to a first-key generation request, restores the first key from the shares based on the first key in response to a second-key generation request, encrypts, with the first key, a part of a plurality of shares based on a part or all of the first key as a second key with which second data is decodable, and generates a plurality of shares based on the second key.

According to the present disclosure, an information processing method is provided that includes: generating, from a first key with which first data is decodable, a plurality of shares based on the first key in response to a first-key generation request, restoring the first key from the shares based on the first key in response to a second-key generation request, encrypting, with the first key, a part of a plurality of shares based on a part or all of the first key as a second key with which second data is decodable, and generating a plurality of shares based on the second key.

According to the present disclosure, a program is provided that causing a computer to function as an information processing apparatus comprising a control unit that generates, from a first key with which first data is decodable, a plurality of shares based on the first key in response to a first-key generation request, restores the first key from the shares based on the first key in response to a second-key generation request, encrypts, with the first key, a part of a plurality of shares based on a part or all of the first key as a second key with which second data is decodable, and generates a plurality of shares based on the second key.

Advantageous Effects of Invention

As described above, the present disclosure provides a technology for performing the flexible access control to permit the decoding of secret information exclusively with a specific user in a case where the secret splitting is hierarchially executed. Furthermore, the above-described advantage is not necessarily for the purpose of limitation, and together with the above-described advantage or instead of the above-described advantage, any advantage mentioned in this description or other advantages that may be understood from this description may be produced.

BRIEF DESCRIPTION OF DRAWINGS

FIG. 15 is a sequence diagram that illustrates an example of the process to share the latitude and longitude as an example of personal data.

FIG. 16 is a flowchart that illustrates an example of inter-family information sharing process.

FIG. 17 illustrates a hardware configuration of the information processing apparatus (server) 10 according to the embodiment.

DESCRIPTION OF EMBODIMENTS

Figure 1:
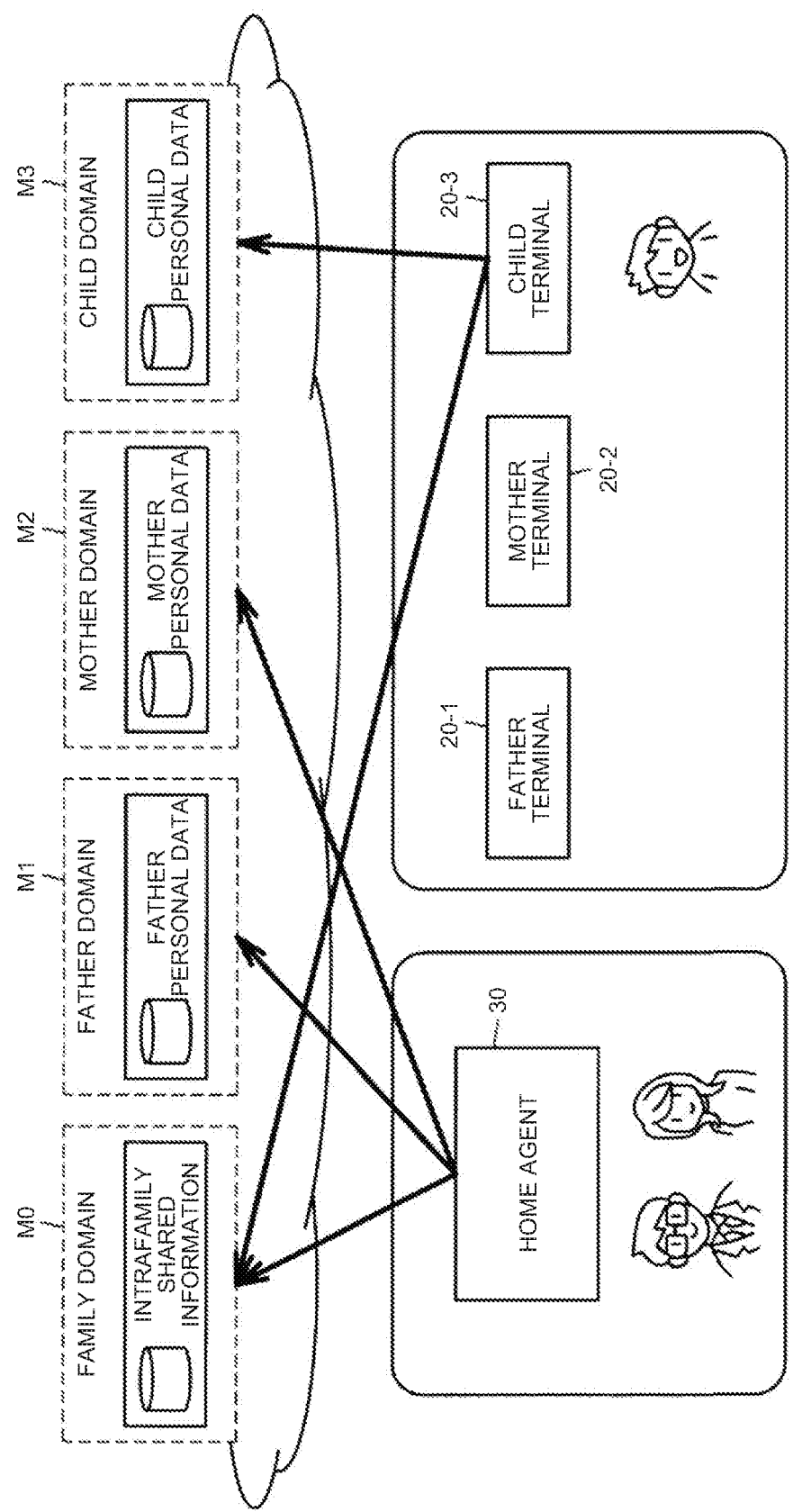
FIG. 1 is a diagram that illustrates a first use case principally assumed according to an embodiment of the present disclosure.

With reference to the accompanying drawings, preferred embodiments according to the present disclosure are described below. In the description and the drawings, the components having substantially the same functional configuration are denoted by the same reference numeral, and duplicated descriptions are omitted.

Furthermore, in the description and the drawings, the components having substantially the same or similar functional configuration may be denoted by different numbers after the same reference numeral so as to be discriminated. However, if the components having substantially the same or similar functional configuration do not particularly need to be discriminated from each other, they are denoted by only the same reference numeral. Furthermore, the similar components in different embodiments may be attached with different alphabets after the same reference numeral so as to be discriminated. However, if the similar components do not particularly need to be discriminated from each other, they are denoted by the same reference numeral.

Furthermore, descriptions are given in the following order.

0. Outline
1. Details of Embodiment
 1.0. System Configuration Example
 1.1. Functional Configuration Example of Server
 1.2. Overall Function
  1.2.1. Family-information Registration Process
  1.2.2. First-user Registration Process
  1.2.3. Second-user Registration Process
  1.2.4. Family-shared Information Storage Process
  1.2.5. Family-shared Information Acquisition Process
  1.2.6. Personal-data Storage Process
  1.2.7. Personal-data Acquisition Process
  1.2.8. Personal-data Sharing Process
  1.2.9. Access Control
  1.2.10. Various Modifications
 1.3. Operation Example
  1.3.1. Family-information Registration Process
  1.3.2. User Registration Process
  1.3.3. Family-shared Information Storage Process
  1.3.4. Personal-data Storage Process
  1.3.5. Personal-data Sharing Process
  1.3.6. Inter-family Information Sharing Process 2. Hardware Configuration Example
3. Conclusion

0. OUTLINE

First, the outline of an embodiment according to the present disclosure is described.

First, a first use case principally assumed according to the embodiment of the present disclosure is described. FIG. 1 is a diagram that illustrates the first use case principally assumed according to the embodiment of the present disclosure. According to the embodiment of the present disclosure, as illustrated in FIG. 1, the information about a family is divided into a plurality of domains, and the access to the domains is controlled. A family including a father, a mother, and a child is assumed in the example illustrated in FIG. 1. However, the members included in the family are not limited to this example.

Furthermore, referring to FIG. 1, a family domain M0, a father domain M1, a mother domain M2, and a child domain M3 are present as examples of the domains. The family domain M0 includes information (e.g., address) shared by the family. The father domain M1 includes personal data on the father. The mother domain M2 includes personal data on the mother. The child domain M3 includes personal data on the child.

For example, when the father uses a home agent 30, the father is allowed to access the family domain M0 and the father domain M1 via the home agent 30. Furthermore, for example, when the mother uses the home agent 30, the mother is allowed to access the family domain M0 and the mother domain M2 via the home agent 30. When the child uses a child terminal 20-3, the child is allowed to access the family domain M0 and the child domain M3 via the child terminal 20-3.

Figure 2:
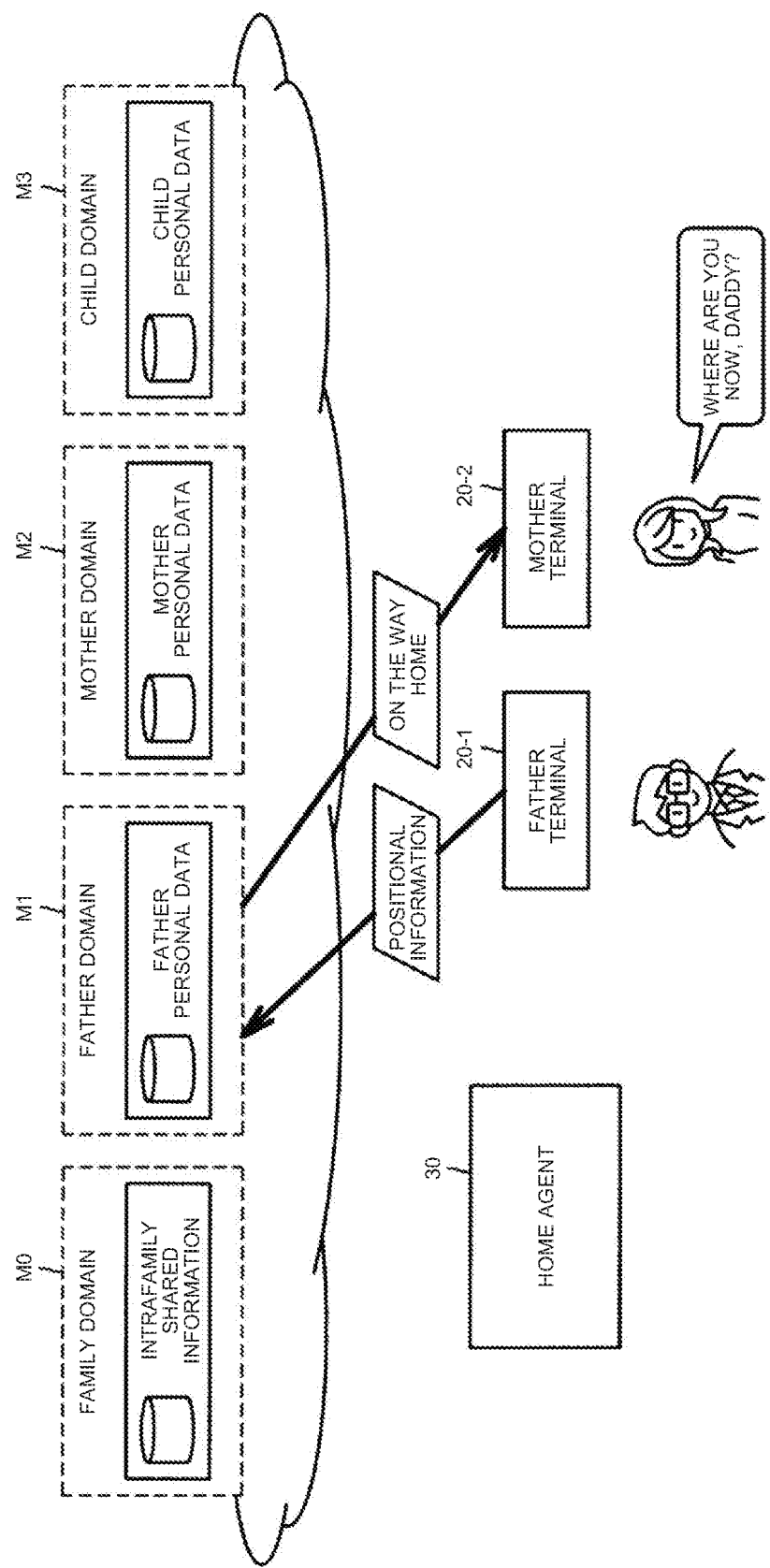
FIG. 2 is a diagram that illustrates a second use case principally assumed according to the embodiment.

Next, a second use case principally assumed according to the embodiment of the present disclosure is described. FIG. 2 is a diagram that illustrates the second use case principally assumed according to the embodiment of the present disclosure. According to the embodiment of the present disclosure, the access to the different user's domain is allowed due to the transfer of the access authority. Specifically, as illustrated in FIG. 2, when the positional information transmitted from a father terminal 20-1 is stored in the father domain M1, a mother terminal 20-2 may acquire the information "on the way home" based on the positional information in the father domain M1.

In the case principally assumed according to the embodiment of the present disclosure, the father terminal 20-1, the mother terminal 20-2, and the child terminal 20-3 are smartphones. However, the father terminal 20-1, the mother terminal 20-2, and the child terminal 20-3 are not limited to smartphones. For example, each of the father terminal 20-1, the mother terminal 20-2, and the child terminal 20-3 may be a mobile phone, a tablet terminal, or a PC (Personal Computer).

Here, a comparative example is described.

Figure 3:
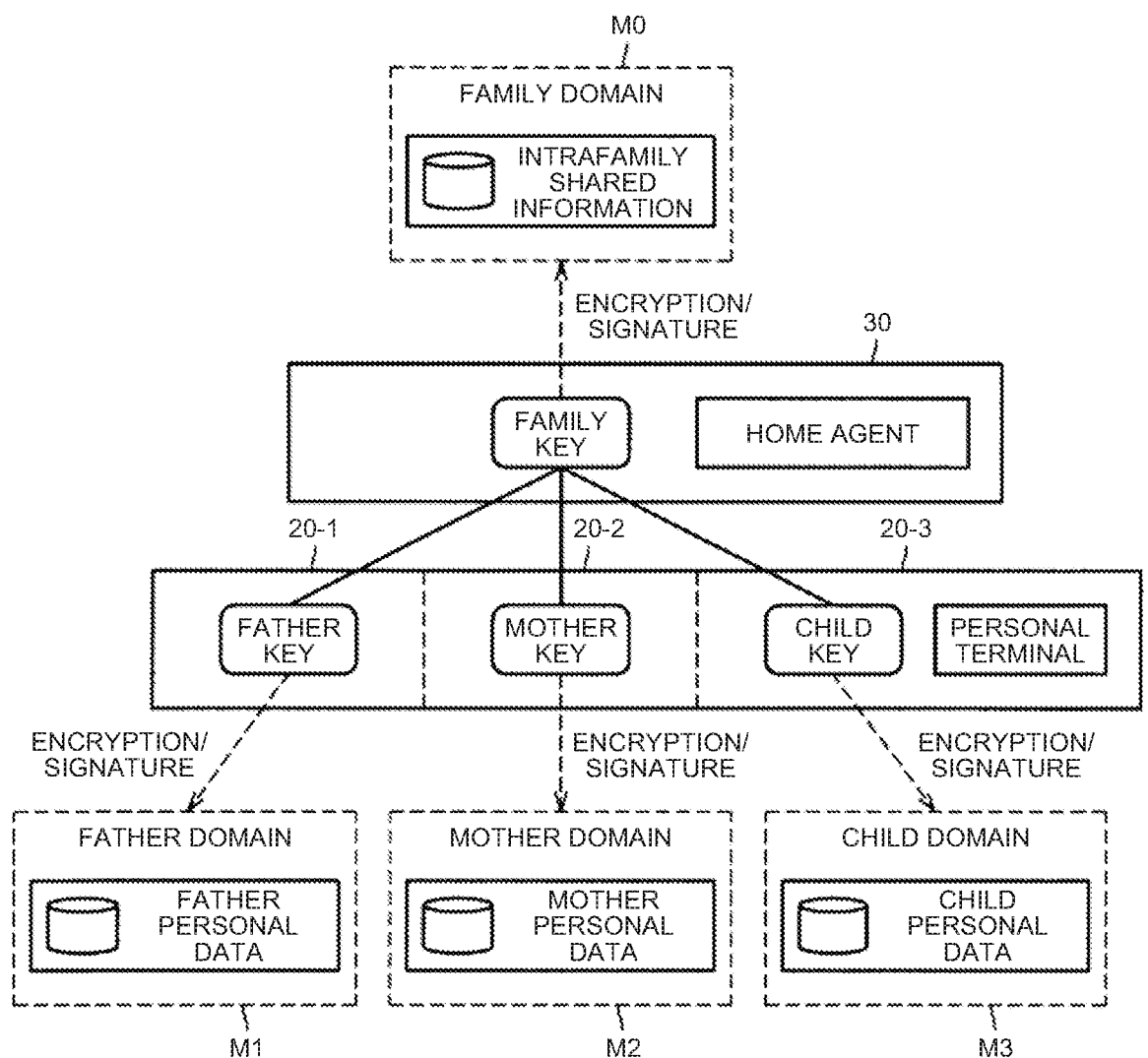
FIG. 3 is a diagram that illustrates access control according to a comparative example.

FIG. 3 is a diagram that illustrates the access control according to the comparative example. With reference to FIG. 3, the family domain M0, the father domain M1, the mother domain M2, and the child domain M3 are present. The home agent 30 holds a family key for accessing the family domain M0. The father terminal 20-1 holds a key (father key) for accessing the father domain M1. The mother terminal 20-2 holds a key (mother key) for accessing the mother domain M2. The child terminal 20-3 holds a key (child key) for accessing the child domain M3.

Here, the above-described first use case is assumed. In the comparative example, however, the home agent 30 has only the family key, the home agent 30 is not allowed to access the father domain M1, the mother domain M2, and the child domain M3.

Conversely, the father terminal 20-1 has only the father key, the mother terminal 20-2 has only the mother key, and the child terminal 20-3 has only the child key; therefore, the father terminal 20-1, the mother terminal 20-2, and the child terminal 20-3 (hereinafter, any of the terminals is also referred to as "personal terminal") are not allowed to access the family domain M0. If the personal terminal has the family key, it is difficult to reject the access to the family domain M0 in a case where, for example, the father and the mother need to break off their relationship due to a divorce. Although it is possible to revoke the family key and issue a new family key, there are costs in re-encryption, or the like, accompanied with the key replacement.

Furthermore, the above-described second use case is assumed. According to the comparative example, however, in the case of secret splitting of, for example, k=2 and n=3, although the mother is allowed to access the family key when the mother obtains the agreement with the father and/or the child, the mother terminal 20-2 is not allowed to access the father key as the mother terminal 20-2 holds only the mother key.

The outline of the embodiment according to the present disclosure has been described above.

1. DETAILS OF EMBODIMENT

Next, the details of the embodiment according to the present disclosure are described.

1.0. System Configuration Example

Figure 4:
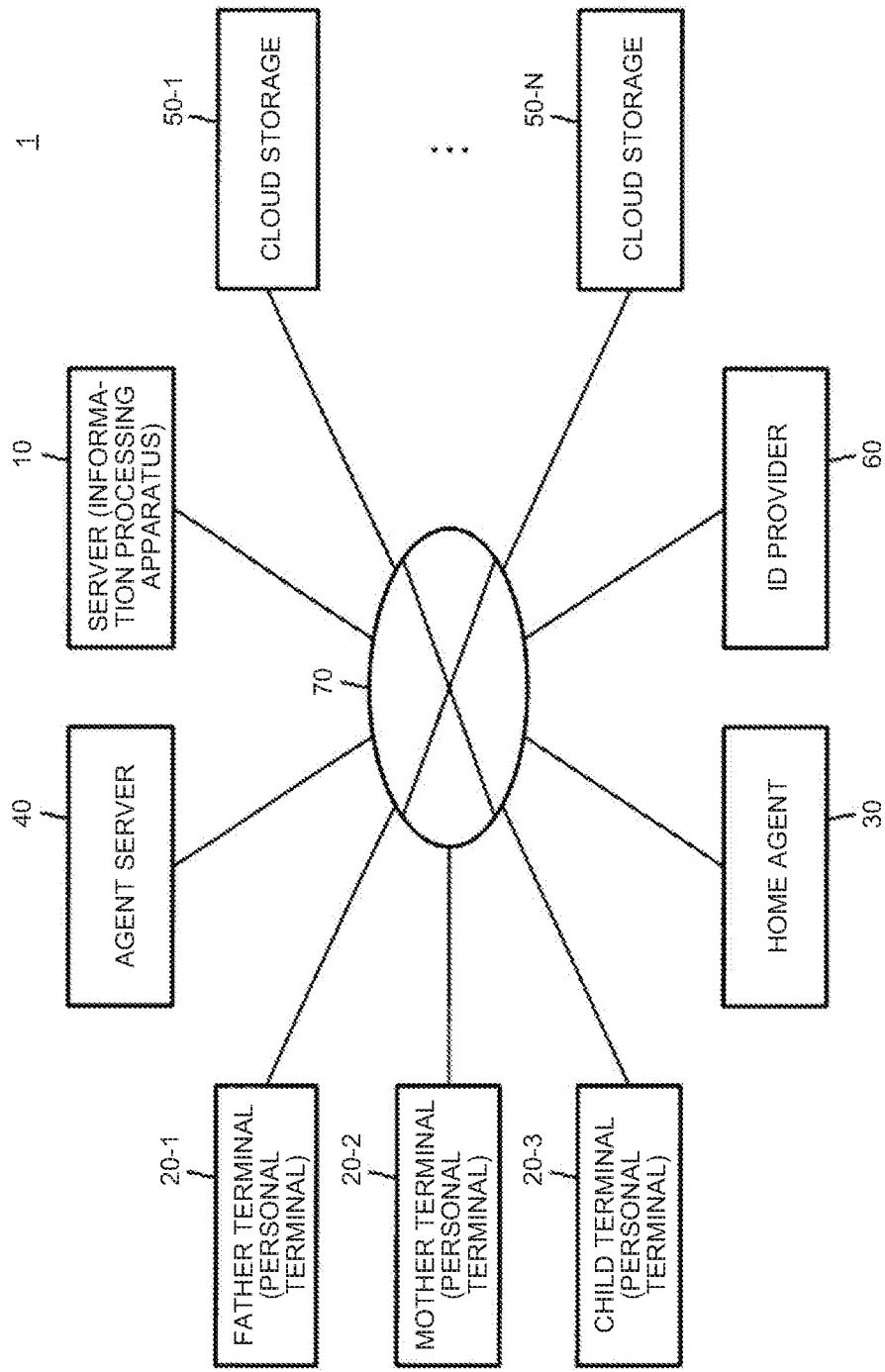
FIG. 4 is a diagram that illustrates an example of the configuration of an information processing system according to the embodiment.

FIG. 4 is a diagram that illustrates an example of the configuration of an information processing system according to the embodiment of the present disclosure. As illustrated in FIG. 4, an information processing system 1 includes a server 10 as an example of an information processing apparatus, the father terminal 20-1, the mother terminal 20-2, the child terminal 20-3, the home agent 30, an agent server 40, cloud storages 50-1 to 50-N as examples of an information provision device, and an ID provider 60. The server 10, the father terminal 20-1, the mother terminal 20-2, the child terminal 20-3, the home agent 30, the agent server 40, the cloud storages 50-1 to 50-N, and the ID provider 60 are coupled to a network 70.

1.1. Functional Configuration Example of Server

Figure 5:
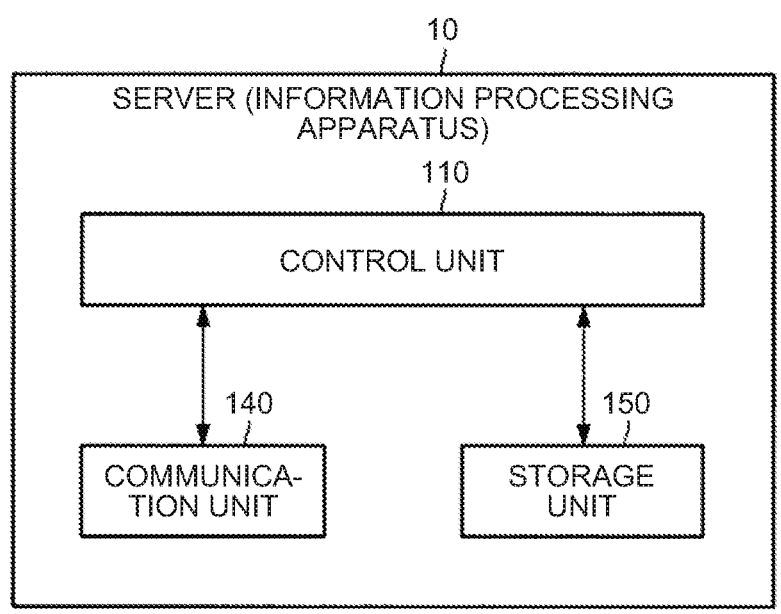
FIG. 5 is a diagram that illustrates a functional configuration example of a server according to the embodiment.

First, a functional configuration example of the server 10 according to the embodiment of the present disclosure is described. FIG. 5 is a diagram that illustrates a functional configuration example of the server 10 according to the embodiment of the present disclosure. As illustrated in FIG. 5, the server 10 includes a control unit 110, a communication unit 140, and a storage unit 150.

The control unit 110 controls each unit of the server 10. Furthermore, the control unit 110 may include, for example, a CPU (Central Processing Unit). When the control unit 110 includes a processing device such as a CPU, the processing device may include an electronic circuit.

The communication unit 140 has a function to communicate with other devices via the network 70. For example, the communication unit 140 includes a communication interface. For example, the communication unit 140 may communicate with the agent server 40 and the cloud storages 50-1 to 50-N via the network 70.

The storage unit 150 is a recording medium that stores a program executed by the control unit 110 and stores data necessary to execute the program. Furthermore, the storage unit 150 temporarily stores data for calculations by the control unit 110. The storage unit 150 may be a magnetic storage device, a semiconductor storage device, an optical storage device, or a magnetooptical storage device.

The functional configuration example of the server 10 according to the embodiment of the present disclosure has been described above.

1.2. Overall Function

Figure 6:
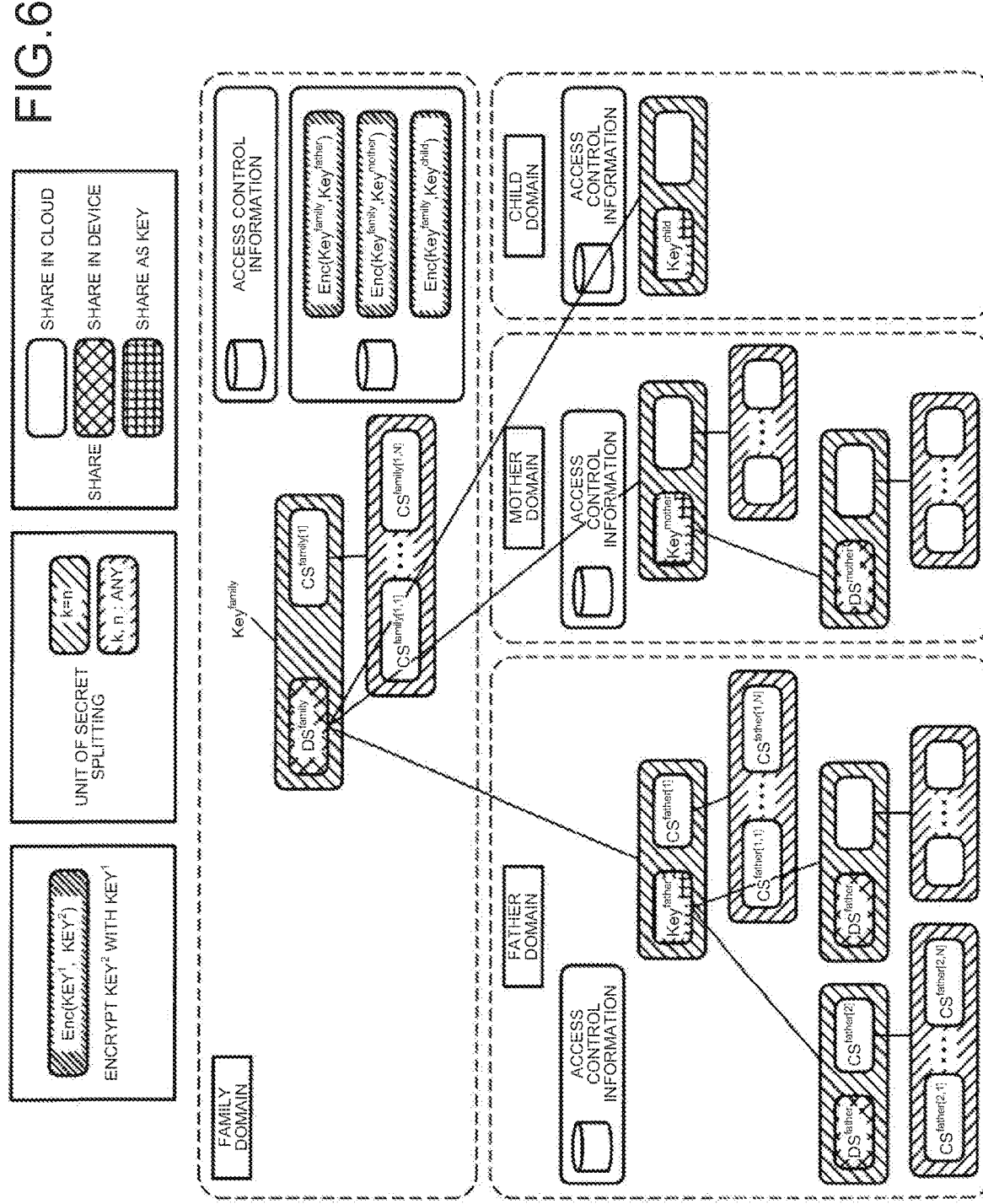
FIG. 6 is a diagram that illustrates the overall function of the information processing system according to the embodiment.

Next, the overall function of the information processing system 1 according to the embodiment of the present disclosure is described. FIG. 6 is a diagram that illustrates the overall function of the information processing system 1 according to the embodiment of the present disclosure.

(1.2.1. Family-Information Registration Process)

With reference to FIG. 4 to FIG. 6, an example of the process to register family information is described. First, the father terminal 20-1 transmits the ID and the password to the ID provider 60 and, in response to the return of the token issued corresponding to the ID and the password from the ID provider 60, transmits the family registration request including the token to the home agent 30. In the case assumed here, the father uses the father terminal 20-1 to register family information; however, a family member (e.g., the mother or the child) other than the father may register family information.

In response to the reception of the family registration request including the token, the home agent 30 transmits the family registration request including the token to the agent server 40. The agent server 40 transmits the authentication request including the token to the ID provider 60 and, in response to the return of the ID corresponding to the token from the ID provider 60, transmits a family-key generation request (first-key generation request) to the server 10.

In the server 10, after the communication unit 140 receives the family-key generation request, the control unit 110 generates, as $\text{Key}^{family}$, a family key (first key) with which intra$^{family}$ shared information (first data) is decodable based on the family-key generation request. Then, the control unit 110 generates a plurality of shares based on $\text{Key}^{family}$ from $\text{Key}^{family}$. More specifically, the control unit 110 splits $\text{Key}^{family}$ into a plurality of shares in the secret splitting technique.

Based on the family-key generation request, the control unit 110 controls the communication unit 140 so as to transmit a part ($\text{DS}^{family}$) of the shares based on $\text{Key}^{family}$ to the agent server 40 (a first information provision device). In response to the reception of $\text{DS}^{family}$, the agent server 40 generates the family ID corresponding to $\text{DS}^{family}$ and registers the family ID in the storage device thereof. After the agent server 40 transmits $\text{DS}^{family}$ to the home agent 30, the home agent 30 receives and stores $\text{DS}^{family}$ and gives the reply indicating that the family registration has been completed to the father terminal 20-1.

Furthermore, based on the family-key generation request, the control unit 110 controls the communication unit 140 so as to transmit another part ($\text{CS}^{family\,[1]}$) of the shares based on $\text{Key}^{family}$ to the cloud storages 50-1 to 50-N (a second information provision device). More specifically, the control unit 110 splits the another part ($\text{CS}^{family\,[1]}$) into $\text{CS}^{family\,[1,1]}$ to $CS^{family[1,N]}$ in the secret splitting technique and controls the communication unit 140 so as to transmit $CS^{family\;[1,1]}$ to the cloud storage 50-1, transmit $CS^{family\;[1,2]}$ to the cloud storage 50-2, and transmit $CS^{family\;[1,N]}$ to the cloud storage 50-N.

(1.2.2. First-User Registration Process)

Next, an example of the process to register the father as a first user is described. In the case assumed here, the father is registered as the first user; however, a family member (e.g., the mother or the child) other than the father may be registered as the first user. The father terminal 20-1 transmits the ID and the password to the ID provider 60 and, in response to the return of the token issued corresponding to the ID and the password from the ID provider 60, transmits the user registration request including the token to the home agent 30.

In response to the reception of the user registration request including the token, the home agent 30 reads $DS^{family}$ from the storage device thereof and transmits the user registration request including $DS^{family}$ and the token to the agent server 40. The agent server 40 transmits the authentication request including the token to the ID provider 60 and, in response to the return of the ID corresponding to the token from the ID provider 60, transmits the father-key generation request (second-key generation request) including $DS^{family}$ to the server 10.

In the server 10, after the communication unit 140 receives the father-key generation request, the control unit 110 acquires $DS^{family}$ from the father-key generation request in response to the father-key generation request and restores the family key from $DS^{family}$. More specifically, in response to the acquisition of $DS^{family}$ from the father-key generation request, the control unit 110 acquires $CS^{father[1]}$ corresponding to $DS^{family}$ from the cloud storages 50-1 to 50-N and combines $DS^{family}$ with $CS^{father\;[1]}$ to obtain $Key^{family}$ (family key).

Then, the control unit 110 generates a part of a plurality of shares based on a part or all of $Key^{family}$ as $Key^{father}$ that is the father key (second key) with which the father personal data (second data) is decodable. Here, in the primary case assumed here, the control unit 110 generates, as $Key^{father}$, a part of a plurality of shares based on a part ($DS^{family}$) of $Key^{family}$. However, the control unit 110 may generate, as $Key^{father}$, a part of a plurality of shares based on all ($DS^{family}$ and $CS^{family\;[1]}$) of $Key^{family}$.

The control unit 110 encrypts $Key^{father}$ with $Key^{family}$ to generate the encrypted key (denoted by $Enc(Key^{family}, Key^{father})$ in FIG. 6) and stores the generated $Enc(Key^{family}, Key^{father})$ in the storage unit 150. Then, the control unit 110 generates a plurality of shares based on $Key^{father}$. More specifically, the control unit 110 splits $Key^{father}$ into a plurality of shares in the secret splitting technique.

Based on the father-key generation request, the control unit 110 controls the communication unit 140 so as to transmit a part ($DS^{father}$) of the shares based on $Key^{father}$ to the agent server 40 (the first information provision device). After receiving $DS^{father}$, the agent server 40 generates the user $ID^{father}$ corresponding to $DS^{father}$ and registers the user $ID^{father}$ in the storage device thereof. After the agent server 40 transmits $DS^{father}$ to the home agent 30, the home agent 30 transmits $DS^{father}$ to the father terminal 20-1, and the father terminal 20-1 receives and stores $DS^{father}$.

Furthermore, based on the father-key generation request, the control unit 110 controls the communication unit 140 so as to transmit another part ($CS^{father[1]}$) of the shares based on $Key^{father}$ to the cloud storages 50-1 to 50-N (the second information provision device). More specifically, the control unit 110 splits the another part ($CS^{father[1]}$) into $CS^{father\;[1,1]}$ to $CS^{father[1,N]}$ in the secret splitting technique and controls the communication unit 140 so as to transmit $CS^{father[1,1]}$ to the cloud storage 50-1, transmit $CS^{father[1,2]}$ to the cloud storage 50-2, and transmit $CS^{father[1,N]}$ to the cloud storage 50-N.

Furthermore, based on the father-key generation request, the control unit 110 controls the communication unit 140 so as to transmit another part ($CS^{father[2]}$) of the shares based on $Key^{father}$ to the cloud storages 50-1 to 50-N (the second information provision device). More specifically, the control unit 110 splits the another part ($CS^{father[2]}$) into $CS^{father[2,1]}$ to $CS^{father[2,N]}$ in the secret splitting technique and controls the communication unit 140 so as to transmit $CS^{father[2,1]}$ to the cloud storage 50-1, transmit $CS^{father[2,2]}$ to the cloud storage 50-2, and transmit $CS^{father[2,N]}$ to the cloud storage 50-N.

(1.2.3. Second-User Registration Process)

Next, an example of the process to register the mother as the second user is described. Furthermore, in the case assumed here, the mother is registered as the second user; however, a family member (e.g., the child) other than the mother may be registered as the second user. The mother terminal 20-2 transmits the ID and the password to the ID provider 60 and, in response to the return of the token issued corresponding to the ID and the password from the ID provider 60, transmits the user registration request including the token to the home agent 30.

In response to the reception of the user registration request including the token, the home agent 30 reads $DS^{family}$ from the storage device thereof and transmits the user registration request including $DS^{family}$ and the token to the agent server 40. The agent server 40 transmits the authentication request including the token to the ID provider 60 and, in response to the return of the ID corresponding to the token from the ID provider 60, transmits a mother-key generation request (third-key generation request) including $DS^{family}$ to the server 10.

In the server 10, after the communication unit 140 receives the mother-key generation request, the control unit 110 acquires $DS^{family}$ from the mother-key generation request in response to the mother-key generation request and restores the family key from $DS^{family}$. More specifically, in response to the acquisition of $DS^{family}$ from the mother-key generation request, the control unit 110 acquires $CS^{mother[1]}$ corresponding to $DS^{family}$ from the cloud storages 50-1 to 50-N and combines $DS^{family}$ with $CS^{mother[1]}$ to obtain $Key^{family}$ (family key).

Then, the control unit 110 generates a part of a plurality of shares based on a part or all of $Key^{family}$ as $Key^{mother}$ that is the mother key (third key) with which mother personal data (third data) is decodable. Here, in the primary case assumed, the control unit 110 generates a part of the shares based on part ($DS^{family}$) of $Key^{family}$ as $Key^{mother}$. However, the control unit 110 may generate a part of the shares based on all ($DS^{family}$ and $CS^{family\;[1]}$) of $Key^{family}$ as $Key^{mother}$.

The control unit 110 encrypts $Key^{mother}$ with $Key^{family}$ to generate an encrypted key (denoted by $Enc(Key^{family}, Key^{mother})$ in FIG. 6) and stores the generated $Enc(Key^{family}, Key^{mother})$ in the storage unit 150. Then, the control unit 110 generates a plurality of shares based on $Key^{mother}$. More specifically, the control unit 110 splits $Key^{family}$ into a plurality of shares in the secret splitting technique.

Based on the mother-key generation request, the control unit 110 controls the communication unit 140 so as to transmit a part ($DS^{mother}$) of the shares based on $Key^{mother}$ to the agent server 40 (the first information provision device). In response to the reception of $DS^{mother}$, the agent server 40 generates the user $ID^{mother}$ corresponding to $DS^{mother}$ and registers the user $ID^{mother}$ in the storage device thereof. After the agent server 40 transmits $DS^{mother}$ to the home agent 30, the home agent 30 transmits $DS^{mother}$ to the mother terminal 20-2, and the mother terminal 20-2 receives and stores $DS^{mother}$.

Furthermore, based on the mother-key generation request, the control unit 110 controls the communication unit 140 so as to transmit another part ($CS^{mother[1]}$) of the shares based on $Key^{mother}$ to the cloud storages 50-1 to 50-N (the second information provision device). More specifically, the control unit 110 splits the another part ($CS^{mother[1]}$) into $CS^{mother[1,1]}$ to $CS^{mother[1,N]}$ in the secret splitting technique and controls the communication unit 140 so as to transmit $CS^{mother[1,1]}$ to the cloud storage 50-1, transmit $CS^{mother[1,2]}$ to the cloud storage 50-2, and transmit $CS^{mother[1,N]}$ to the cloud storage 50-N.

Furthermore, based on the mother-key generation request, the control unit 110 controls the communication unit 140 so as to transmit another part ($CS^{mother[2]}$) of the shares based on $Key^{mother}$ to the cloud storages 50-1 to 50-N (the second information provision device). More specifically, the control unit 110 splits the another part ($CS^{mother[2]}$) into $CS^{mother[2,1]}$ to $C^{Smother[2,N]}$ in the secret splitting technique and controls the communication unit 140 so as to transmit $CS^{mother[2,1]}$ to the cloud storage 50-1, transmit $CS^{mother[2,2]}$ to the cloud storage 50-2, and transmit $CS^{mother[2, N]}$ to the cloud storage 50-N.

(1.2.4. Family-Shared Information Storage Process)

Next, an example of the process to store family shared information (first data) is described. Here, an example of the process to store the home address and the latitude and longitude as the family shared information is described. However, the family shared information is not limited to this example. The father terminal 20-1 transmits the address registration request including the address and the latitude and longitude to the home agent 30. In the case assumed here, the father stores the family shared information by using the father terminal 20-1; however, a family member (e.g., the mother or the child) other than the father may store the family shared information.

In response to the reception of the address registration request including the address and the latitude and longitude, the home agent 30 acquires $DS^{family}$ from the the storage device thereof and transmits $DS^{family}$ and the address registration request including the address and the latitude and longitude to the agent server 40. In response to the reception of the address registration request from the home agent 30, the agent server 40 transmits the address encryption request (first encryption request) including $DS^{family}$, the address, and the latitude and longitude to the server 10.

In the server 10, after the communication unit 140 receives the address encryption request, the control unit 110 acquires a part ($DS^{family}$) of the shares based on $Key^{family}$ and acquires another part ($CS^{family\,[1]}$) of the shares based on $Key^{family}$ in response to the address encryption request and decodes $Key^{family}$ based on the part ($DS^{family}$) and the another part ($CS^{family\,[1]}$) of the shares based on $Key^{family}$.

More specifically, the control unit 110 acquires the part ($DS^{family}$) of the shares based on $Key^{family}$ from the address encryption request, acquires the another part ($CS^{family\,[1]}$) of the shares based on $Key^{family}$ from the cloud storages 50-1 to 50-N, and combines the part ($DS^{family}$) and the another part ($CS^{family\,[1]}$) of the shares based on $Key^{family}$ to restore $Key^{family}$. The control unit 110 encrypts the address and the latitude and longitude with the restored $Key^{family}$ and controls the communication unit 140 so as to transmit the address and the latitude and longitude, which have been encrypted, to the agent server 40.

In response to the reception of the address and the latitude and longitude encrypted, the agent server 40 stores the address and the latitude and longitude encrypted. The agent server 40 sends the reply indicating that the registration of the address and the latitude and longitude has been completed to the father terminal 20-1 via the home agent 30.

(1.2.5. Family Shared Information Acquisition Process)

Figure 7:
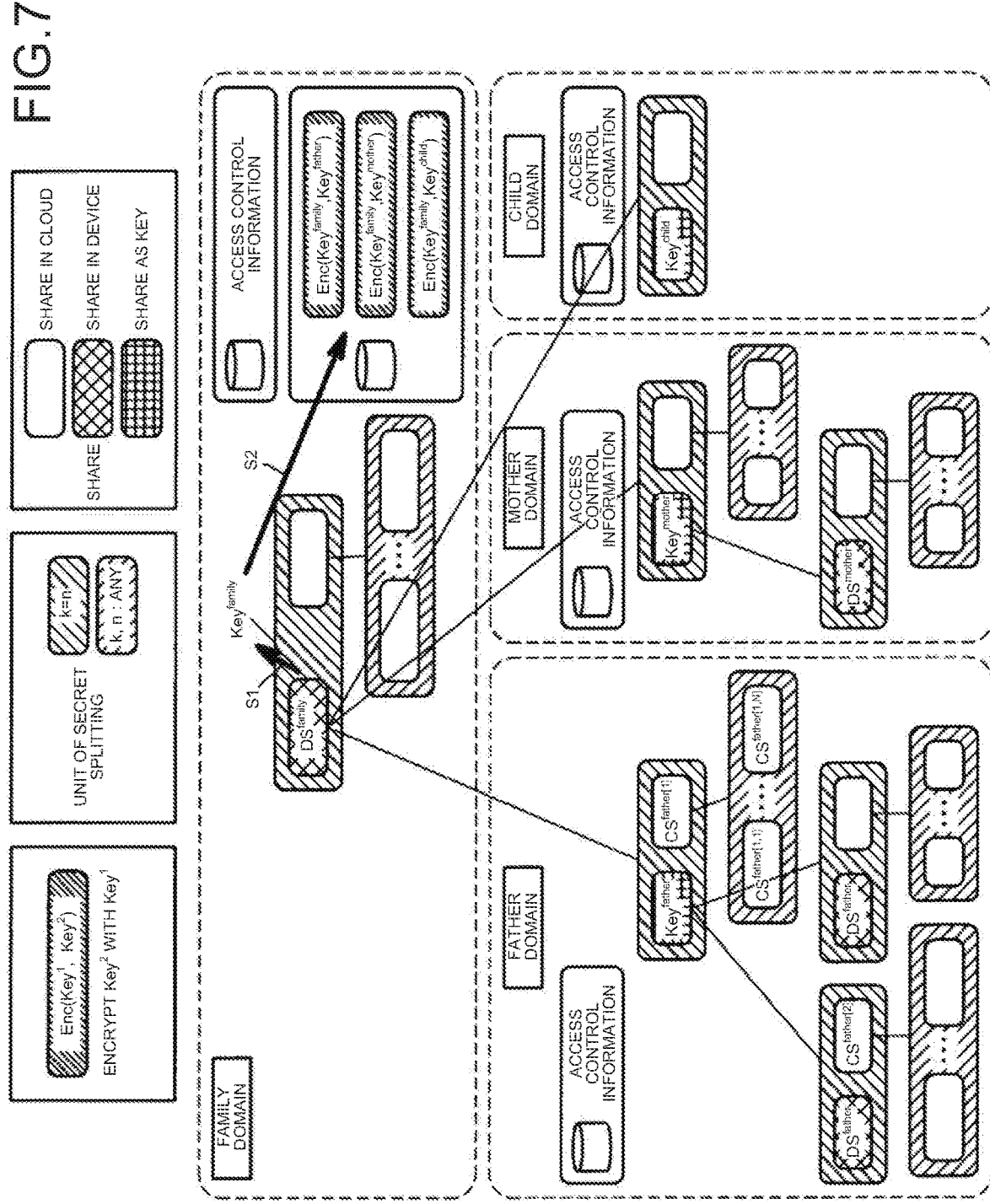
FIG. 7 is a diagram that illustrates an example of the process to acquire family shared information and personal data by using a home agent.
Figure 8:
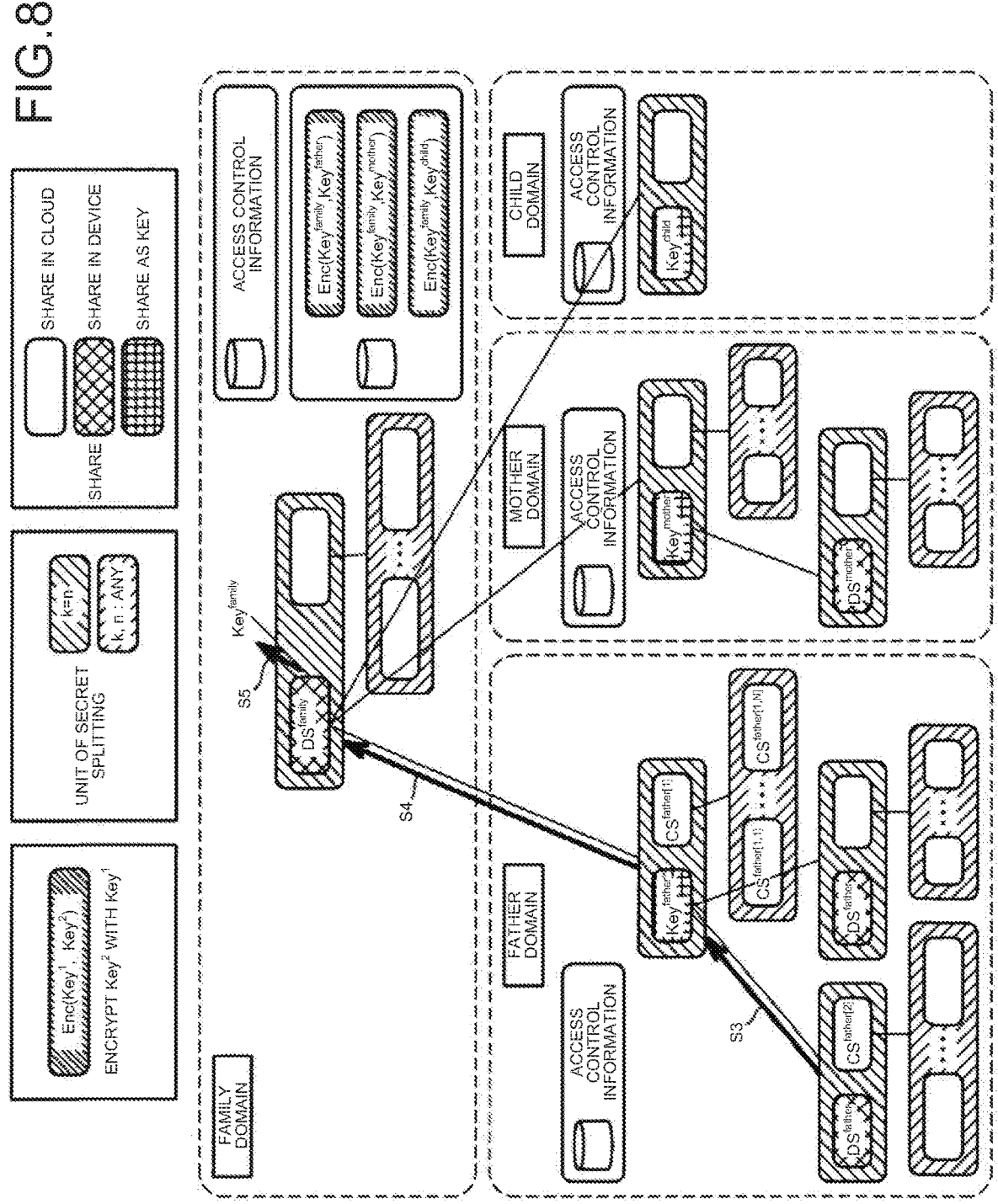
FIG. 8 is a diagram that illustrates an example of the process to acquire family shared information and personal data by using a father terminal.

Next, an example of the process to acquire family shared information is described. FIG. 7 is a diagram that illustrates an example of the process to acquire family shared information and personal data by using the home agent 30. FIG. 8 is a diagram that illustrates an example of the process to acquire family shared information and personal data by using the father terminal 20-1. First, with reference to FIG. 7, an example of the process to acquire family shared information by using the home agent 30 is described.

The home agent 30 recognizes the user who uses the home agent 30. Here, the user may be recognized in any way. The user may be recognized through the face recognition on the image captured by a camera provided in the home agent 30, or the user may be recognized through the sound recognition on the sound information collected by a microphone provided in the home agent 30.

In a case where the father is recognized as an example of the user, the home agent 30 derives $Key^{family}$ from $DS^{family}$ (S1) and transmits the address acquisition request including $Key^{family}$ to the agent server 40. In the case assumed here, the father acquires family shared information by using the home agent 30; however, a family member (e.g., the mother or the child) other than the father may acquire family shared information. In response to the reception of the address acquisition request including $Key^{family}$, the agent server 40 acquires the address and the latitude and longitude encrypted with $Key^{family}$ from the storage device thereof and transmits the address decoding request including $Key^{family}$ and the address and the latitude and longitude encrypted to the server 10.

In the server 10, after the communication unit 140 receives the address decoding request, the control unit 110 decodes the address and the latitude and longitude based on the address decoding request. First, based on the address decoding request, the control unit 110 acquires $Key^{family}$ from the address decoding request and decodes the address and the latitude and longitude with $Key^{family}$. The control unit 110 returns the address and the latitude and longitude to the home agent 30 via the agent server 40.

Next, with reference to FIG. 8, an example of the process to acquire family shared information using the father terminal 20-1 is described. First, the father terminal 20-1 transmits the address acquisition request including $DS^{father}$ to the agent server 40. Furthermore, in the case assumed here, the father uses the father terminal 20-1 to acquire the family shared information; however, a family member (e.g., the mother or the child) other than the father may acquire the family shared information.

In response to the reception of the address acquisition request including $DS^{father}$, the agent server 40 acquires the address and the latitude and longitude encrypted with $Key^{family}$ from the storage device thereof and transmits the address decoding request (first decoding request) including $DS^{father}$ and the address and the latitude and longitude encrypted to the server 10.

In the server 10, after the communication unit 140 receives the address decoding request, the control unit 110 decodes the address and the latitude and longitude based on the address decoding request. First, in response to the address decoding request, the control unit 110 acquires a part ($DS^{father}$) of the shares based on $Key^{father}$, acquires another part ($CS^{father\ [1]}$) of the shares based on $Key^{father}$, and restores $Key^{father}$ based on the part ($DS^{father}$) and the another part ($CS^{father[1]}$) of the shares based on $Key^{father}$ (S3).

More specifically, the control unit 110 acquires the part ($DS^{father}$) of the shares based on $Key^{father}$ from the address decoding request, acquires the another part ($CS^{father\ [2]}$) of the shares based on $Key^{father}$ from the cloud storages 50-1 to 50-N, and combines the part ($DS^{father}$) and the another part ($CS^{father\ [2]}$) of the shares based on $Key^{father}$ to restore $Key^{father}$.

Furthermore, the control unit 110 acquires the another part ($CS^{father\ [1]}$) of a plurality of shares based on a part or all of $Key^{family}$ from the cloud storages 50-1 to 50-N and combines the another part ($CS^{father[1]}$) with $Key^{father}$ to restore a part or all of $Key^{family}$. In the case assumed here, $DS^{family}$ is decoded (S4). The control unit 110 acquires $CS^{family[1]}$ corresponding to $DS^{family}$ from the cloud storages 50-1 to 50-N and combines $DS^{family}$ with $cS^{family[1]}$ to restore $Key^{family}$ (S5).

Then, the control unit 110 decodes the address and the latitude and longitude with $Key^{family}$. The control unit 110 returns the address and the latitude and longitude to the father terminal 20-1 via the agent server 40.

(1.2.6. Personal-Data Storage Process)

Next, an example of the process to store personal data is described. Here, an example of the process to store positional information (the latitude and longitude) on the father as personal data is described. However, the personal data is not limited to this example.

First, the father terminal 20-1 transmits the positional-information storage request including $DS^{father}$ and the latitude and longitude to the agent server 40. In the case assumed here, the father uses the father terminal 20-1 to store personal data; however, a family member (e.g., the mother or the child) other than the father may store the personal data.

In response to the reception of the positional-information storage request including $DS^{father}$ and the latitude and longitude, the agent server 40 transmits the positional-information encryption request (second encryption request) including $DS^{father}$ and the latitude and longitude to the server 10.

In the server 10, after the communication unit 140 receives the positional-information encryption request, the control unit 110 acquires a part ($DS^{father}$) of the shares based on $Key^{father}$ and acquires another part ($CS^{father[2]}$) of the shares based on $Key^{father}$ in response to the positional-information encryption request and restores $Key^{father}$ based on the part ($DS^{father}$) and the another part ($CS^{father[2]}$) of the shares based on $Key^{father}$.

More specifically, the control unit 110 acquires the part ($DS^{father}$) of the shares based on $Key^{father}$ from the positional-information encryption request, acquires the another part ($CS^{father[2]}$) of the shares based on $Key^{father}$ from the cloud storages 50-1 to 50-N, and combines the part ($DS^{father}$) and the another part ($CS^{father[2]}$) of the shares based on $Key^{father}$ to restore $Key^{father}$. The control unit 110 encrypts the latitude and longitude with the restored $Key^{father}$ and controls the communication unit 140 so as to transmit the encrypted latitude and longitude to the agent server 40.

In response to the reception of the encrypted latitude and longitude, the agent server 40 stores the encrypted latitude and longitude. The agent server 40 sends the reply indicating that registration of the latitude and longitude has been completed to the father terminal 20-1 via the home agent 30.

(1.2.7. Personal-Data Acquisition Process)

Next, an example of the process to acquire personal data is described. First, with reference to FIG. 7, an example of the process to acquire personal data by using the home agent 30 is described.

The home agent 30 recognizes the user who uses the home agent 30. The recognition of the user may be performed as described above. In a case where the father is recognized as an example of the user, the home agent 30 derives $Key^{family}$ from $DS^{family}$ (S1) and transmits the positional-information acquisition request including $Key^{family}$ to the agent server 40. In the case assumed here, the father uses the home agent 30 to acquire his own personal data; however, a family member (e.g., the mother or the child) other than the father may acquire her/his own personal data.

In response to the reception of the father positional-information acquisition request including $Key^{family}$, the agent server 40 transmits the father positional-information decoding request including $Key^{family}$ to the server 10. In the server 10, the control unit 110 acquires $Key^{family}$ from the father positional-information decoding request and decodes $Key^{father}$ with $Key^{family}$. Then, the control unit 110 decodes the latitude and longitude with $Key^{father}$. The control unit 110 returns the latitude and longitude to the home agent 30 via the agent server 40.

Next, with reference to FIG. 8, an example of the process to acquire personal data by using the father terminal 20-1 is described. First, the father terminal 20-1 transmits the positional-information acquisition request including $DS^{father}$ to the agent server 40. In the case assumed here, the father uses the father terminal 20-1 to acquire his own personal data; however, a family member (e.g., the mother or the child) other than the father may acquire his/her own personal data.

In response to the reception of the positional-information acquisition request including $DS^{father}$, the agent server 40 acquires the address and the latitude and longitude encrypted with $Key^{father}$ from the storage device thereof and transmits the positional-information decoding request (second decoding request) including $DS^{father}$ and the encrypted latitude and longitude to the server 10.

In the server 10, after the communication unit 140 receives the positional-information decoding request, the control unit 110 restores $Key^{father}$ (S3) and decodes the latitude and longitude with $Key^{father}$ in response to the positional-information decoding request. First, based on the positional-information decoding request, the control unit 110 acquires a part ($DS^{father)father}$) of the shares based on $Key^{father}$, acquires another part ($CS^{father[2]}$) of the shares based on $Key^{father}$, and restores $Key^{father}$ based on the part ($DS^{father)father}$) and the another part ($CS^{father[2]}$) of the shares based on $Key^{father}$.

More specifically, the control unit 110 acquires the part ($DS^{father}$) of the shares based on $Key^{father}$ from the positional-information decoding request, acquires the another part ($CS^{father[2]}$) of the shares based on $Key^{father}$ from the cloud storages 50-1 to 50-N, and combines the part ($DS^{father)father}$) and the another part ($CS^{father[2]}$) of the shares based on $Key^{father}$ to restore $Key^{father}$.

Then, the control unit 110 decodes the latitude and longitude with $Key^{father}$. The control unit 110 returns the latitude and longitude to the father terminal 20-1 via the agent server 40 and the home agent 30.

(1.2.8. Personal-Data Sharing Process)

Next, an example of the process to share personal data is described. Here, an example of the process to share the positional information (the latitude and longitude) on the father as personal data is described. However, the personal data is not limited to this example. Furthermore, an example where father personal data is shared by the mother is described here. However, there is no limitation on whose personal data it is and who shares the personal data.

Figure 9:
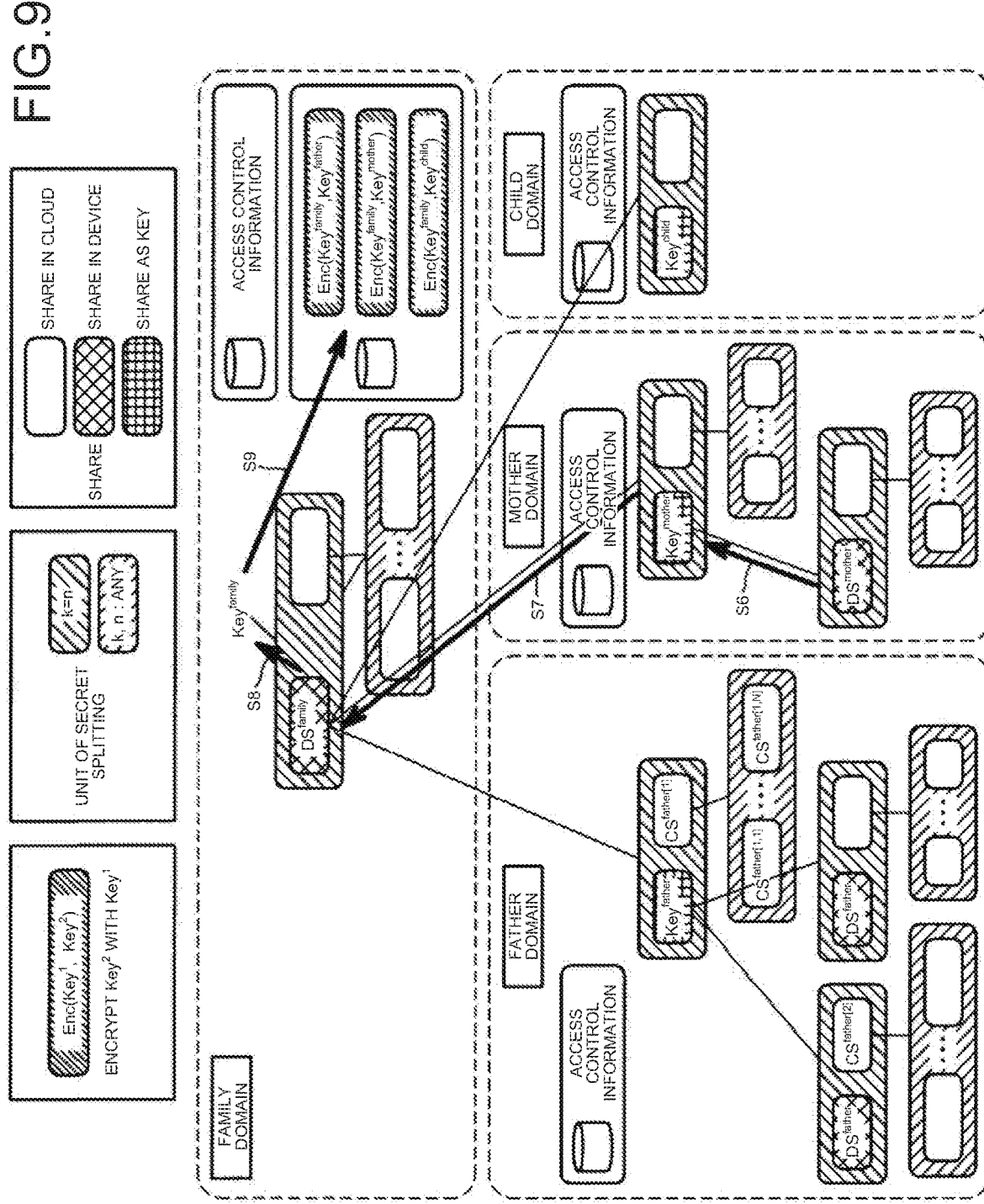
FIG. 9 is a diagram that illustrates an example of the process to share father personal data by using a mother terminal.

FIG. 9 is a diagram that illustrates an example of the process to share father personal data by using the mother terminal 20-2. First, the mother terminal 20-2 transmits the father positional-information sharing request including $DS^{mother}$ to the agent server 40. In response to the reception of the father positional-information sharing request including $DS^{mother}$, the agent server 40 acquires the latitude and longitude encrypted with $Key^{father}$ from the storage device thereof and transmits the father positional-information decoding request (third decoding request) including $DS^{mother}$ and the encrypted latitude and longitude to the server 10.

In the server 10, after the communication unit 140 receives the father positional-information decoding request, the control unit 110 restores $Key^{mother}$ (S6), restores $Key^{family}$ based on $Key^{mother}$, restores $Key^{father}$ based on $Key^{family}$, and decodes the latitude and longitude with $Key^{father}$ in response to the father positional-information decoding request. First, based on the father positional-information decoding request, the control unit 110 acquires a part ($DS^{mother}$) of the shares based on $Key^{mother}$, acquires another part ($CS^{mother[2]}$) of the shares based on $Key^{mother}$, and restores $Key^{mother}$ based on the part ($DS^{mother}$) and the another part ($CS^{mother[2]}$) of the shares based on $Key^{mother}$.

More specifically, the control unit 110 acquires the part ($DS^{mother}$) of the shares based on $Key^{mother}$ from the positional-information decoding request, acquires the another part ($CS^{mother[2]}$) of the shares based on $Key^{mother}$ from the cloud storages 50-1 to 50-N, and combines the part ($DS^{mother}$) and the another part ($CS^{mother[2]}$) of the shares based on $Key^{mother}$ to restore $Key^{mother}$.

Then, the control unit 110 acquires another part ($CS^{mother[1]}$) of the shares based on a part or all of $Key^{family}$ and restores $Key^{family}$ based on the another part ($CS^{mother[1]}$) and $Key^{mother}$.

More specifically, the control unit 110 acquires the another part ($CS^{mother[1]}$) of the shares based on a part or all of $Key^{family}$ from the cloud storages 50-1 to 50-N and combines the another part ($CS^{mother[1]}$) with $Key^{mother}$ to restore a part or all of $Key^{family}$. In the case assumed here, $DS^{family}$ is restored (S7). The control unit 110 acquires $CS^{family[1]}$ corresponding to $DS^{family}$ from the cloud storages 50-1 to 50-N and combines $DS^{family}$ with $CS^{family[1]}$ to restore $Key^{family}$ (S8).

Then, the control unit 110 decodes $Key^{father}$ based on $Key^{family}$ (S9). The control unit 110 decodes the latitude and longitude with $Key^{father}$. The control unit 110 returns the latitude and longitude to the mother terminal 20-2 via the agent server 40. Here, the agent server 40 may directly return the latitude and longitude of the father to the mother terminal 20-2; however, it is possible that the home address is also decoded by the control unit 110 using $Key^{family}$. In such a case, the agent server 40 may return, to the mother terminal 20-2, the information about the distance between the father and the home based on the latitude and longitude corresponding to the home address and the latitude and longitude of the father or may return, to the mother terminal 20-2, the information about the distance between the father and the station closest to the home address.

(1.2.9. Access Control)

A family key, a father key, and a mother key may be restored as described above. At this point, there may be a limitation on the restoration of a key. Specifically, the control unit 110 may perform a control as to whether a key is to be restored based on access control information. For example, the access control information may be set such that the control unit 110 does not restore a family key in a case where the child terminal 20-3 has had access and the control unit 110 restores a family key in a case where the father terminal 20-1 or the mother terminal 20-2 has had access.

Specifically, the control unit 110 may perform a control as to whether a family key is to be restored based on access control information. Furthermore, the control unit 110 may perform a control as to whether a father key is to be restored based on access control information. Furthermore, the control unit 110 may perform a control as to whether a mother key is to be restored based on access control information. Moreover, the control unit 110 may perform a control as to whether a child key is to be restored based on access control information.

Furthermore, as described above, family shared information and father personal data may be decoded. At this point, there may be a limitation on the decoding of various types of data. Specifically, the control unit 110 may perform a control as to whether data is to be decoded based on access control information. For example, the access control information may be set such that the control unit 110 does not decode family shared information in a case where the child terminal 20-3 has had access and the control unit 110 decodes family shared information in a case where the father terminal 20-1 or the mother terminal 20-2 has had access.

(1.2.10. Various Modifications)

Figure 10:
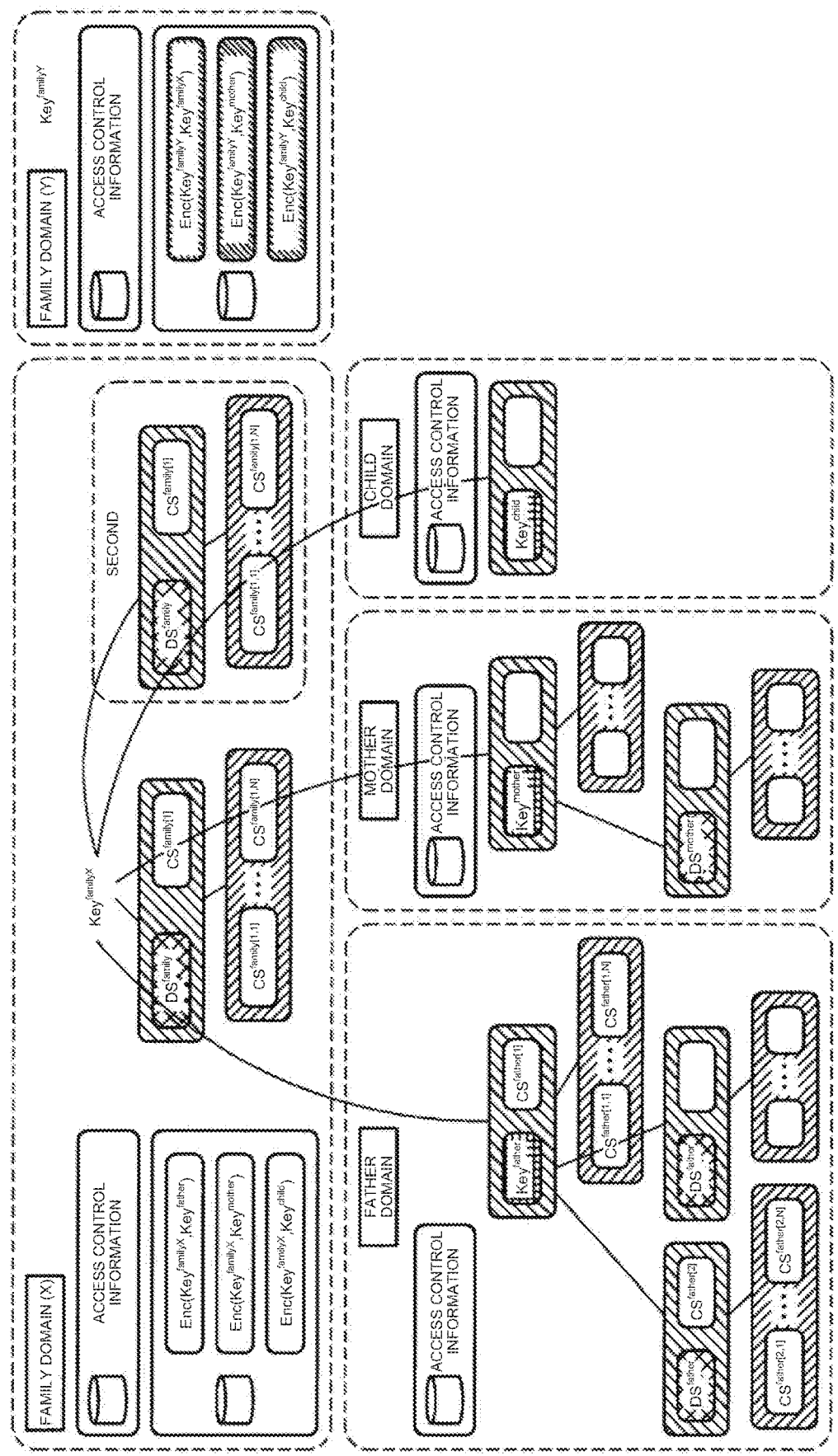
FIG. 10 is a diagram that illustrates various modifications.

FIG. 10 is a diagram that illustrates various modifications. As described above, it is primarily assumed that the single home agent 30 is provided in the single home. However, the multiple home agents 30 may be provided in the single home. For example, as illustrated in FIG. 10, in a case where the second home agent 30 is added to the single home, the control unit 110 splits $Key^{family}$ again and causes the "second" home agent 30 to hold $DS^{family}$ that is different from $DS^{family}$ held by the first home agent 30.

Furthermore, the one or more home agents 30 may be provided in each of the homes. For example, as illustrated in FIG. 10, a second home (a family domain Y) may be provided in addition to a first home (a family domain X), and the home agent 30 may be provided in each of the first home (the family domain X) and the second home (the family domain Y). At this point, as illustrated in FIG. 10, in a case where the second family is allowed to access the first home (the family domain X), the control unit 110 encrypts $Key^{familyX}$ of the first family X with $Key^{familyY}$ of the second family Y, whereby the mutual access is possible.

The overall function of the information processing system 1 according to the embodiment of the present disclosure has been described above.

1.3. Operation Example

Next, an operation example of the information processing system 1 according to the embodiment of the present disclosure is described.

(1.3.1. Family-Information Registration Process)

Figure 11:
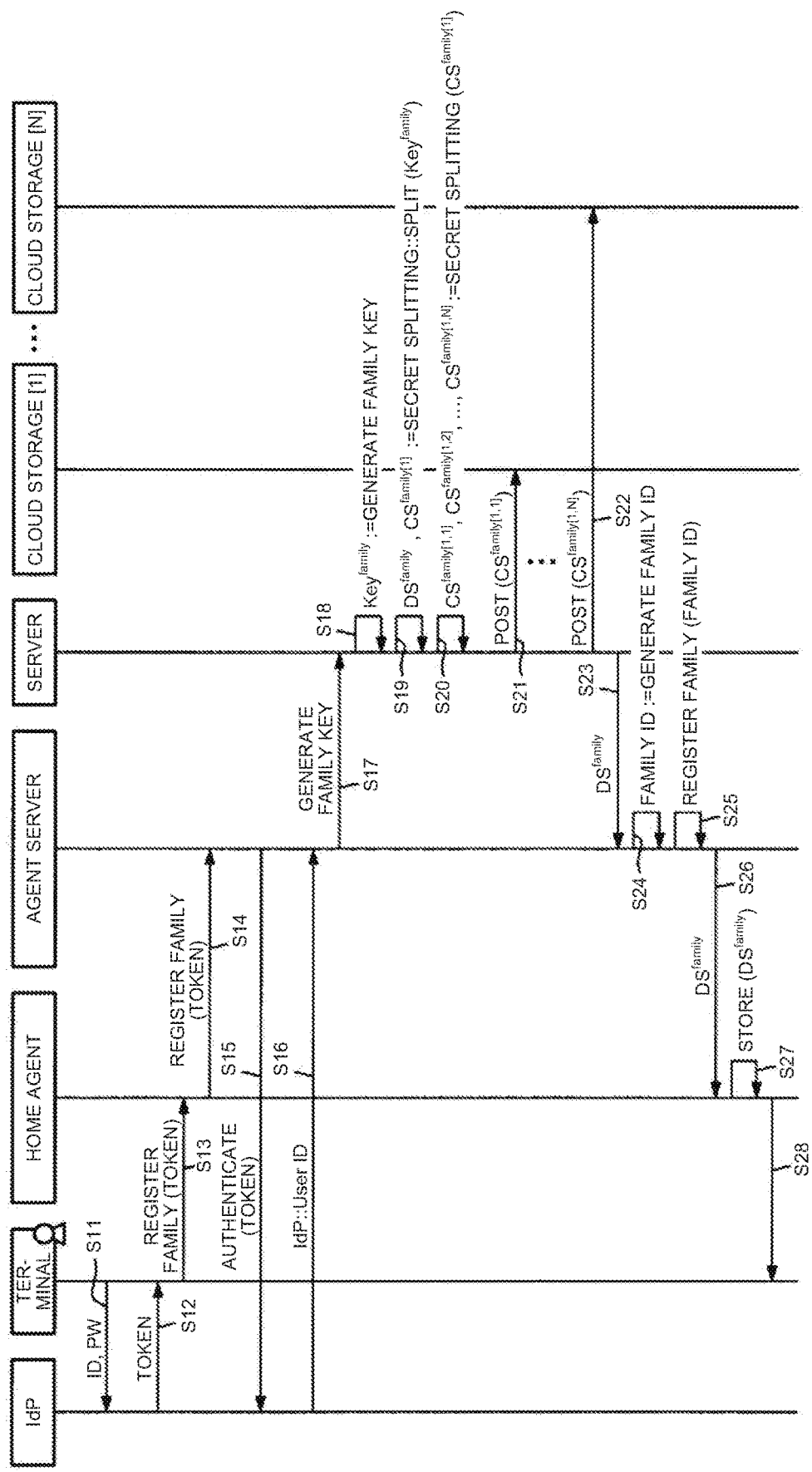
FIG. 11 is a sequence diagram that illustrates an example of the process to register family information.

FIG. 11 is a sequence diagram that illustrates an example of the process to register family information. With reference to FIG. 11, an example of the process to register family information is described. Furthermore, the sequence diagram illustrated in FIG. 11 is merely an example of the process to register family information. Therefore, the process to register family information is not limited to the example of the process in the sequence diagram illustrated in FIG. 11.

As illustrated in FIG. 11, the father terminal 20-1 transmits the ID and the password to the ID provider 60 (S11) and, in response to the return of the token issued corresponding to the ID and the password from the ID provider 60 (S12), transmits the family registration request including the token to the home agent 30 (S13). In response to the reception of the family registration request including the token, the home agent 30 transmits the family registration request including the token to the agent server 40 (S14).

The agent server 40 transmits the authentication request including the token to the ID provider 60 (S15) and, in response to the return of the ID corresponding to the token from the ID provider 60 (S16), transmits the family-key generation request (first-key generation request) to the server 10 (S17).

In the server 10, after the communication unit 140 receives the family-key generation request, the control unit 110 generates, as $Key^{family}$, the family key (first key) with which intrafamily shared information (first data) is decodable based on the family-key generation request (S18). Then, the control unit 110 splits $Key^{family}$ into a plurality of shares in the secret splitting technique (S19).

The control unit 110 splits another part ($CS^{family\,[1]}$) of the shares based on $Key^{family}$ into $CS^{family\,[1,1]}$ to $CS^{family\,[1,N]}$ in the secret splitting technique (S20) and controls the communication unit 140 so as to transmit $CS^{family\,[1,1]}$ to the cloud storage 50-1 (S21), transmit $CS^{family\,[1,2]}$ to the cloud storage 50-2, and transmit $CS^{family\,[1,N]}$ to the cloud storage 50-N (S22).

Based on the family-key generation request, the control unit 110 controls the communication unit 140 so as to transmit a part ($DS^{family}$) of the shares based on $Key^{family}$ to the agent server 40 (the first information provision device) (S23). In response to the reception of $DS^{family}$, the agent server 40 generates the family ID corresponding to $DS^{family}$ (S24) and registers the family ID in the storage device thereof (S25). After the agent server 40 transmits $DS^{family}$ to the home agent 30 (S26), the home agent 30 receives and stores $DS^{family}$ (S27) and sends the reply indicating that the family registration has been completed to the father terminal 20-1 (S28).

(1.3.2. User Registration Process)

Figure 12:
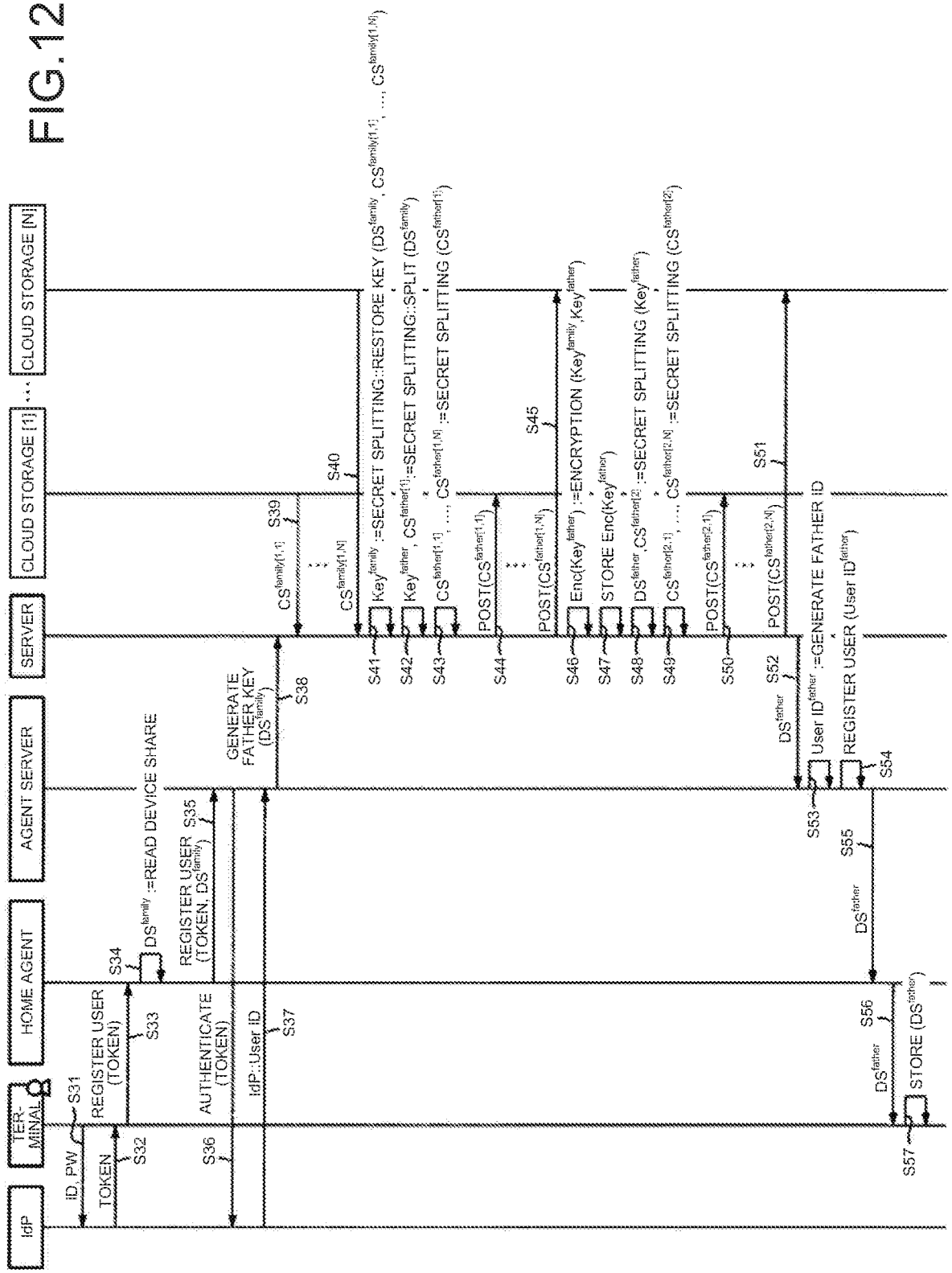
FIG. 12 is a sequence diagram that illustrates an example of the process to register a father as an example of a user.

FIG. 12 is a sequence diagram that illustrates an example of the process to register the father as an example of the user. With reference to FIG. 12, an example of the process to register the father as an example of the user is described. Furthermore, the sequence diagram illustrated in FIG. 12 is merely an example of the user registration process. Therefore, the user registration process is not limited to the example of the process in the sequence diagram illustrated in FIG. 12.

As illustrated in FIG. 12, the father terminal 20-1 transmits the ID and the password to the ID provider 60 (S31) and, in response to the return of the token issued corresponding to the ID and the password from the ID provider 60 (S32), transmits the user registration request including the token to the home agent 30 (S33). In response to the reception of the user registration request including the token, the home agent 30 reads $DS^{family}$ from the storage device thereof (S34) and transmits the user registration request including $DS^{family}$ and the token to the agent server 40 (S35).

The agent server 40 transmits the authentication request including the token to the ID provider 60 (S36) and, in response to the return of the ID corresponding to the token from the ID provider 60 (S37), transmits the father-key generation request (second-key generation request) including $DS^{family}$ to the server 10 (S38).

In the server 10, after the communication unit 140 receives the father-key generation request, the control unit 110 acquires $DS^{family}$ from the father-key generation request, acquires $CS^{father[1]}$ corresponding to $DS^{family}$ from the cloud storages 50-1 to 50-N (S39, S40), and combines $DS^{family}$ with $CS^{father[1]}$ to obtain $Key^{family}$ (family key) (S41). Then, the control unit 110 generates a part of a plurality of shares based on a part ($DS^{family}$)) of $Key^{family}$ as $Key^{father}$ that is the father key (second key) with which the father personal data (second data) is decodable and generates another part as $CS^{father[1]}$ (S42).

The control unit 110 splits the another part ($CS^{father[1]}$) into $CS^{father[1,1]}$ to $CS^{father[1,N]}$ in the secret splitting technique (S43) and controls the communication unit 140 so as to transmit $CS^{father[1,1]}$ to the cloud storage 50-1 (S44), transmit $CS^{father[1,2]}$ to the cloud storage 50-2, and transmit $CS^{father[1,N]}$ to the cloud storage 50-N (S45).

Furthermore, the control unit 110 encrypts $Key^{father}$ with $Key^{family}$ to generate an encrypted key (denoted by Enc ($Key^{family}$, $Key^{father}$) in FIG. 6) (S46) and stores the generated Enc($Key^{family}$, $Key^{father}$) in the storage unit 150 (S47). Then, the control unit 110 splits $Key^{father}$ into a plurality of shares in the secret splitting technique (S48).

The control unit 110 splits another part ($CS^{father[2]}$) of the shares based on $Key^{father}$ into $CS^{father[2,1]}$ to $CS^{father[2,N]}$ in the secret splitting technique (S49) and controls the communication unit 140 so as to transmit $CS^{father[2,1]}$ to the cloud storage 50-1 (S50), transmit $CS^{father[2,2]}$ to the cloud storage 50-2, and transmit $CS^{father[2,N]}$ to the cloud storage 50-N (S51).

Based on the father-key generation request, the control unit 110 controls the communication unit 140 so as to transmit a part ($DS^{father}$) of the shares based on $Key^{father}$ to the agent server 40 (the first information provision device) (S52). In response to the reception of $DS^{father}$, the agent server 40 generates the user $ID^{father}$ corresponding to $DS^{father}$ (S53) and registers the user $ID^{father}$ in the storage device thereof (S54). After the agent server 40 transmits $DS^{father}$ to the home agent 30 (S55), the home agent 30 transmits $DS^{father}$ to the father terminal 20-1 (S56), and the father terminal 20-1 receives and stores $DS^{father}$ (S57).

(1.3.3. Family-Shared Information Storage Process)

Figure 13:
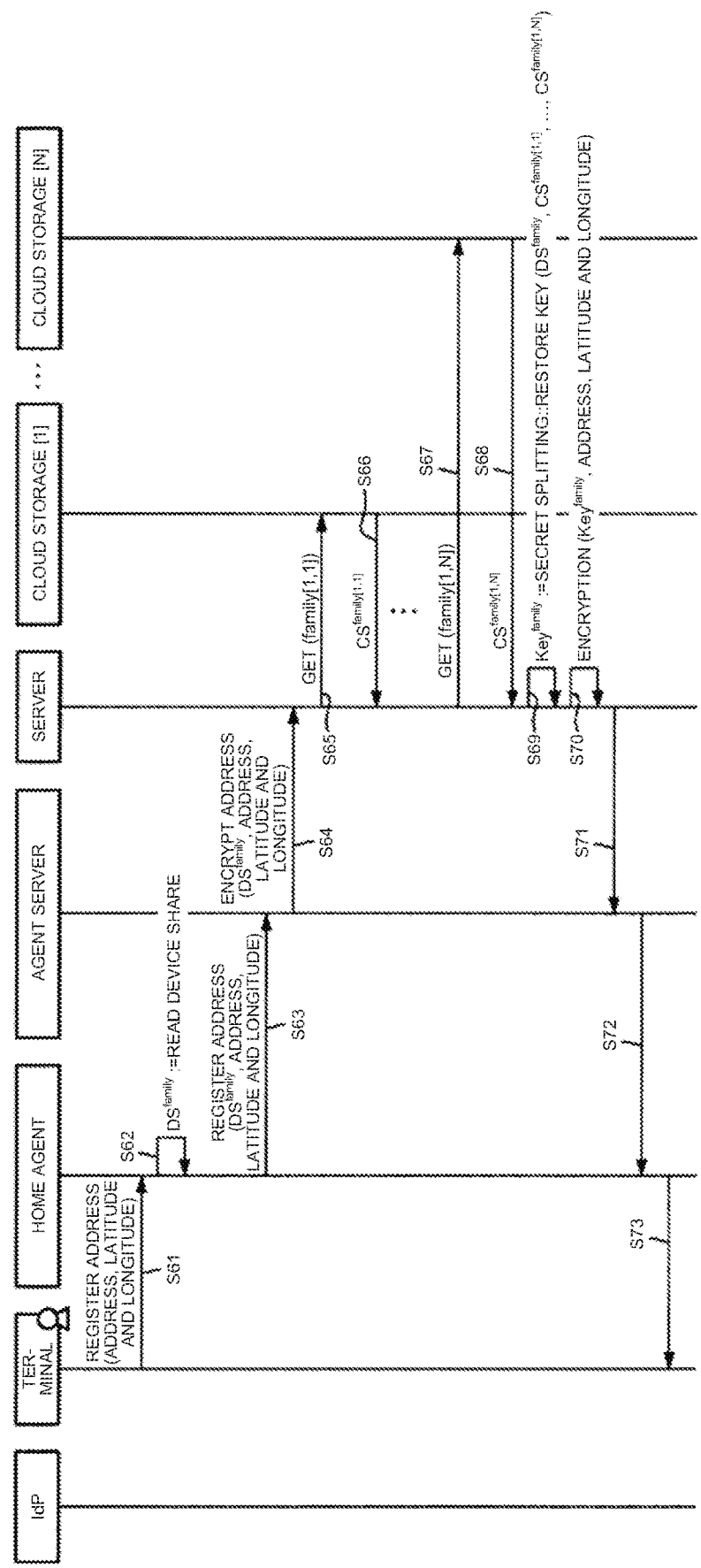
FIG. 13 is a sequence diagram that illustrates an example of the process to register an address as an example of family shared information.

FIG. 13 is a sequence diagram that illustrates an example of the process to register the address as an example of the family shared information. With reference to FIG. 13, an example of the process to register the address as an example of the family shared information is described. Furthermore, the sequence diagram illustrated in FIG. 13 is merely an example of the process to register the family shared information. Therefore, the process to register the family shared information is not limited to the example of the process in the sequence diagram illustrated in FIG. 13.

First, the father terminal 20-1 transmits the address registration request including the address and the latitude and longitude to the home agent 30 (S61). In response to the reception of the address registration request including the address and the latitude and longitude, the home agent 30 acquires $DS^{family}$ from the storage device thereof (S62) and transmits the address registration request including $DS^{family}$, the address, and the latitude and longitude to the agent server 40 (S63). In response to the reception of the address registration request from the home agent 30, the agent server 40 transmits the address encryption request (first encryption request) including $DS^{family}$, the address, and the latitude and longitude to the server 10 (S64).

In the server 10, after the communication unit 140 receives the address encryption request, the control unit 110 acquires a part ($DS^{family}$) of the shares based on $Key^{family}$ from the address encryption request, acquires another part ($CS^{family\,[1]}$) of the shares based on $Key^{family}$ from the cloud storages 50-1 to 50-N (S65 to S68), and combines the part ($DS^{family}$) and the another part ($CS^{family\,[1]}$) of the shares based on $Key^{family}$ to restore $Key^{family}$ (S69). The control unit 110 encrypts the address and the latitude and longitude with the restored $Key^{family}$ (S70) and controls the communication unit 140 so as to transmit the address and the latitude and longitude encrypted to the agent server 40 (S71).

In response to the reception of the address and the latitude and longitude encrypted, the agent server 40 stores the address and the latitude and longitude encrypted. The agent server 40 sends the reply indicating that the registration of the address and the latitude and longitude has been completed to the father terminal 20-1 via the home agent 30 (S72, S73).

(1.3.4. Personal-Data Storage Process)

Figure 14:
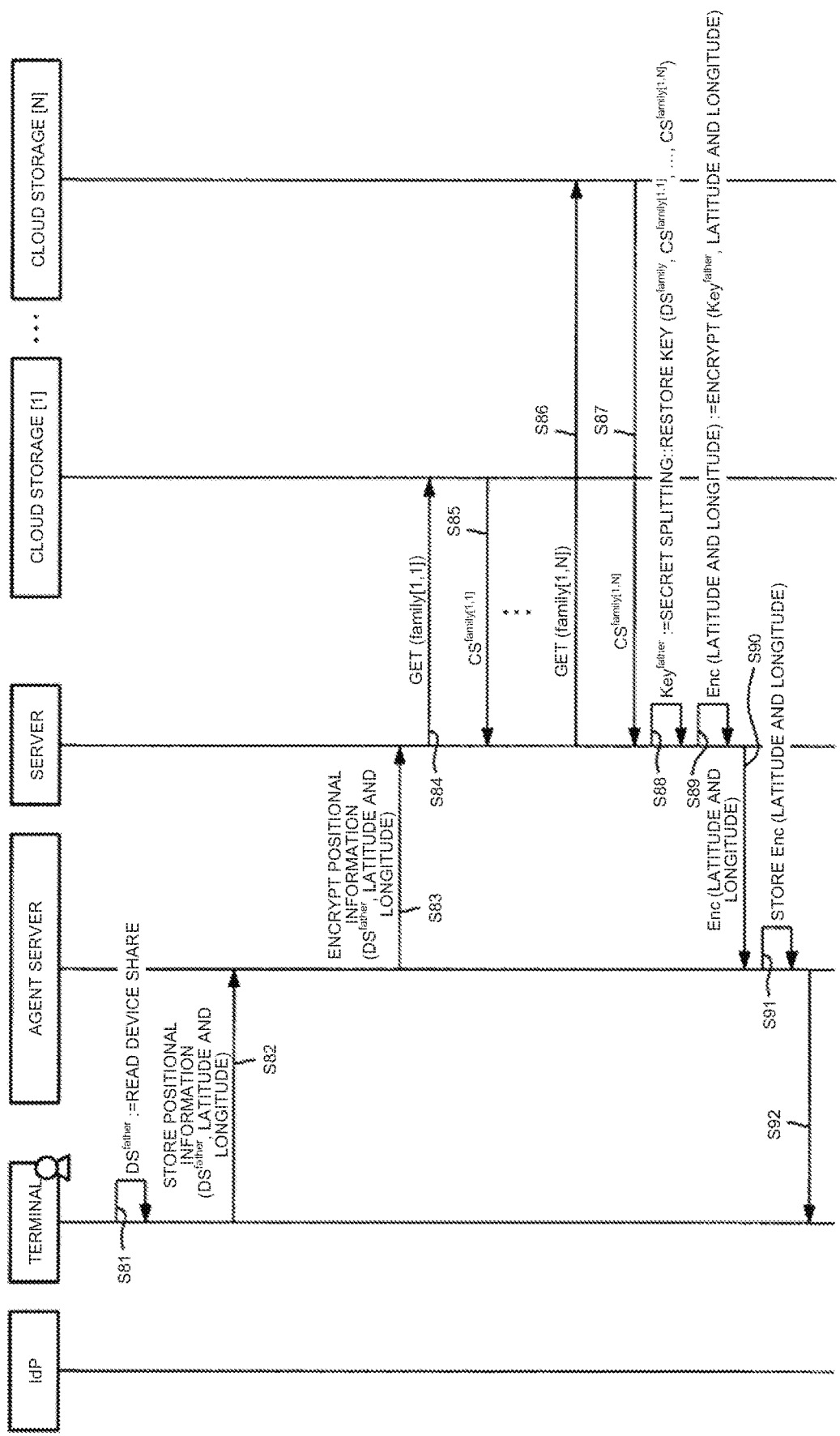
FIG. 14 is a sequence diagram that illustrates an example of the process to store the latitude and longitude as an example of personal data.

FIG. 14 is a sequence diagram that illustrates an example of the process to store the latitude and longitude as an example of the personal data. With reference to FIG. 14, an example of the process to store the latitude and longitude as an example of the personal data is described. Furthermore, the sequence diagram illustrated in FIG. 14 is merely an example of the process to store personal data. Therefore, the process to store personal data is not limited to the example of the process in the sequence diagram illustrated in FIG. 14.

First, the father terminal 20-1 reads $DS^{father}$ from the storage device thereof (S81) and transmits the positional-information storage request including $DS^{father}$ and the latitude and longitude to the agent server 40 (S82). In response to the reception of the positional-information storage request including $DS^{father}$ and the latitude and longitude, the agent server 40 transmits the positional-information encryption request (second encryption request) including $DS^{father}$ and the latitude and longitude to the server 10 (S83).

In the server 10, after the communication unit 140 receives the positional-information encryption request, the control unit 110 acquires a part ($DS^{father}$) of the shares based on $Key^{father}$ from the positional-information encryption request, acquires another part ($CS^{father[2]}$) of the shares based on $Key^{father}$ from the cloud storages 50-1 to 50-N(S84 to S87), and combines the part ($DS^{father}$) and the another part ($CS^{father[2]}$) of the shares based on $Key^{father}$ to restore $Key^{father}$ (S88). The control unit 110 encrypts the latitude and longitude with the restored $Key^{father}$ (S89) and controls the communication unit 140 so as to transmit the encrypted latitude and longitude to the agent server 40 (S90).

In response to the reception of the encrypted latitude and longitude, the agent server 40 stores the encrypted latitude and longitude (S91). The agent server 40 sends the reply indicating that the registration of the latitude and longitude has been completed to the father terminal 20-1 (S92).

(1.3.5. Personal-Data Sharing Process)

FIG. 15 is a sequence diagram that illustrates an example of the process to share the latitude and longitude as an example of the personal data. With reference to FIG. 15, an example of the process to share the latitude and longitude as an example of the personal data is described. Furthermore, the sequence diagram illustrated in FIG. 15 is merely an example of the process to share the personal data. Therefore, the process to share the personal data is not limited to the example of the process in the sequence diagram illustrated in FIG. 15.

First, the mother terminal 20-2 reads $DS^{mother}$ from the storage device thereof (S101) and transmits the father positional-information sharing request including $DS^{mother}$ to the agent server 40 (S102). In response to the reception of the father positional-information sharing request including $DS^{mother}$, the agent server 40 acquires the latitude and longitude encrypted with $Key^{father}$ from the storage device thereof (S103) and transmits the father positional-information decoding request (third decoding request) including $DS^{mother}$ and the encrypted latitude and longitude to the server 10 (S104).

In the server 10, after the communication unit 140 receives the father positional-information decoding request, the control unit 110 acquires a part ($DS^{mother}$) of the shares based on $Key^{mother}$ from the positional-information decoding request, acquires another part ($CS^{mother[2]}$) of the shares based on $Key^{mother}$ from the cloud storages 50-1 to 50-N (S105 to S107), and combines the part ($DS^{mother}$) and the another part ($CS^{mother[2]}$) of the shares based on $Key^{mother}$ to restore $Key^{mother}$ (S108).

Then, the control unit 110 acquires another part ($CS^{mother[1]}$) of the shares based on a part or all of $Key^{family}$ from the cloud storages 50-1 to 50-N (S109 to S111) and combines the another part ($CS^{mother[1]}$) with $Key^{mother}$ to restore $DS^{family}$ (S112). The control unit 110 acquires $CS^{family[1]}$ corresponding to $DS^{family}$ from the cloud storages 50-1 to 50-N (S113 to S115) and combines $DS^{family}$ with $CS^{family[1]}$ to restore $Key^{family}$ (S116).

Then, the control unit 110 decodes $Key^{father}$ based on $Key^{family}$ (S117). The control unit 110 decodes the latitude and longitude of the father with $Key^{father}$ (S118) and decodes the address with $Key^{family}$ (S119). The control unit 110 returns the address and the latitude and longitude of the father to the agent server 40 (S120). The agent server 40 generates the information (response) about the distance between the father and the station closest to the home address based on the latitude and longitude corresponding to the address and the latitude and longitude of the father (S121) and returns the generated information to the mother terminal 20-2 (S122).

(1.3.6. Inter-Family Information Sharing Process)

FIG. 16 is a flowchart that illustrates an example of the inter-family information sharing process. With reference to FIG. 16, an example of the inter-family information sharing process is described. Furthermore, the flowchart illustrated in FIG. 16 is merely an example of the inter-family information sharing process. Therefore, the inter-family information sharing process is not limited to the example of the process in the flowchart illustrated in FIG. 16.

As illustrated in FIG. 16, it is assumed here that a family X and a family Y share information. Furthermore, it is assumed that a member of the family X wants to go out with a member of the family Y on the next holiday (S131). Here, the member of the family X provides input to the home agent of the family X as to whether the information on the family X is to be shared with the family Y (S132). Meanwhile, the member of the family Y provides input to the home agent of the family Y as to whether the information on the family Y is to be shared with the family X (S141).

After receiving the information indicating that the information on the family X is to be shared with the family Y from the home agent of the family X and receiving the information indicating that the information on the family Y is to be shared with the family X from the home agent of the family Y, the agent server 40 transmits the information decoding request of the family X and the information decoding request of the family Y to the server 10.

In the server 10, after the communication unit 140 receives the information decoding request of the family X, the control unit 110 unlocks (decodes) the encrypted key$^{familyY}$ with Key$^{familyX}$. Furthermore, after the communication unit 140 receives the information decoding request of the family Y, the control unit 110 unlocks (decodes) the encrypted key$^{familyX}$ with Key$^{familyY}$. The control unit 110 decodes the holiday trip history and the preference information on the family X with Key$^{familyX}$, decodes the holiday trip history and the preference information on the family Y with Key$^{familyY}$, and presents destination candidates based on the holiday trip history and the preference information on them (S152).

The home agent of the family X displays the presented destination candidates as a candidate list (S161). Similarly, the home agent of the family Y displays the presented destination candidates as a candidate list (S171). When the member of the family X refers to the candidate list and determines the destination, the member inputs the information indicating that the destination has been determined to the home agent of the family X (S162). In response to the reception of the information indicating that the destination has been determined from the home agent of the family X, the agent server 40 again locks (encrypts) Key$^{familyX}$ and Key$^{familyY}$ (S153).

An operation example of the information processing system 1 according to the embodiment of the present disclosure has been described above.

<2. Hardware Configuration Example>

Next, with reference to FIG. 17, a hardware configuration of the information processing apparatus (server) 10 according to the embodiment of the present disclosure is described. FIG. 17 is a block diagram that illustrates an example of the hardware configuration of the information processing apparatus 10 according to the embodiment of the present disclosure. Although the example illustrated in FIG. 17 is an example of the hardware configuration of the information processing apparatus 10, the hardware configuration of each of a personal terminal 20, the home agent 30, the agent server 40, a cloud storage 50, and the ID provider 60 may be implemented in the same manner as the hardware configuration example illustrated in FIG. 17.

As illustrated in FIG. 17, the information processing apparatus 10 includes a CPU (Central Processing unit) 901, a ROM (Read Only Memory) 903, and a RAM (Random Access Memory) 905. Furthermore, the information processing apparatus 10 may include a host bus 907, a bridge 909, an external bus 911, an interface 913, an input device 915, an output device 917, a storage device 919, a drive 921, a connection port 923, and a communication device 925. Moreover, the information processing apparatus 10 may include an imaging device 933 and a sensor 935 as appropriate. Instead of or together with the CPU 901, the information processing apparatus 10 may include a processing circuitry called a DSP (Digital Signal Processor) or an ASIC (Application Specific Integrated Circuit).

The CPU 901 functions as an arithmetic processing device and a control device and controls all or part of the operation of the information processing apparatus 10 in accordance with various programs stored in the ROM 903, the RAM 905, the storage device 919, or a removable recording medium 927. The ROM 903 stores programs, calculation parameters, and the like, used by the CPU 901. The RAM 905 temporarily stores programs used by the CPU 901 while in execution, parameters changed as appropriate during the execution, and the like. The CPU 901, the ROM 903, and the RAM 905 are coupled to one another via the host bus 907 that is made up of an internal bus such as a CPU bus. Furthermore, the host bus 907 is coupled to the external bus 911, such as a PCI (Peripheral Component Interconnect/Interface) bus, via the bridge 909.

The input device 915 is a device operated by a user, such as a mouse, a keyboard, a touch panel, a button, a switch, or a lever. The input device 915 may include a microphone that detects the user's voice. The input device 915 may be, for example, a remote control device that uses infrared rays or other radio waves or an external connection device 929 such as a mobile phone that is compatible with operation of the information processing apparatus 10. The input device 915 includes an input control circuitry that generates an input signal based on information input by the user and outputs it to the CPU 901. The user operates the input device 915 to input various types of data to the information processing apparatus 10 or give a command for a processing operation. Furthermore, the imaging device 933 described later captures the movement of the user's hand, the user's finger, or the like, to function as an input device. Here, the pointing position may be determined in accordance with the movement of the hand or the direction of the finger.

The output device 917 includes a device that may visually or aurally notify the user of acquired information. The output device 917 may be, for example, a display device such an LCD (Liquid Crystal Display), a PDP (Plasma Display Panel), an organic EL (Electro-Luminescence) display, or a projector, a hologram display device, a sound output device such as a speaker and a headphone, a printer device, and the like. The output device 917 outputs the result obtained during the processing of the information processing apparatus 10 as a video with a text or an image or outputs it as a sound such as voice or acoustic. Furthermore, the output device 917 may include a light, or the like, that illuminates the periphery.

The storage device 919 is a data storage device that is configured as an example of a storage unit of the information processing apparatus 10. The storage device 919 includes, for example, a magnetic storage device such as an HDD (Hard Disk Drive), a semiconductor storage device, an optical storage device, or a magnetooptical storage device. The storage device 919 stores a program executed by the CPU 901, various types of data, various types of data acquired from outside, and the like.

The drive 921 is a reader/writer for the removable recording medium 927, such as a magnetic disk, an optical disk, a magnetic optical disk, or a semiconductor memory, and is built in or externally connected to the information processing apparatus 10. The drive 921 reads the information recorded in the attached removable recording medium 927 and outputs it to the RAM 905. Furthermore, the drive 921 writes records in the attached removable recording medium 927.

The connection port 923 is a port for directly connecting a device to the information processing apparatus 10. The connection port 923 may be, for example, a USB (Universal Serial Bus) port, an IEEE1394 port, an SCSI (Small Computer System Interface) port. Furthermore, the connection port 923 may be an RS-232C port, an optical audio terminal, an HDMI (registered trademark) (High-Definition Multimedia Interface) port, or the like. The external connection device 929 is connected to the connection port 923 so that various types of data may be exchanged between the information processing apparatus 10 and the external connection device 929.

The communication device 925 is, for example, a communication interface that includes a communication device for connecting to a communication network 931. The communication device 925 may be, for example, a communication card for a wired or wireless LAN (Local Area Network), Bluetooth (registered trademark), or WUSB (Wireless USB). Furthermore, the communication device 925 may be an optical communication router, an ADSL (Asymmetric Digital Subscriber Line) router, or a modem for various types of communications. The communication device 925 transmits and receives signals by using a predetermined protocol, such as TCP/IP, with, for example, the Internet or other communication devices. Furthermore, the communication network 931 connected to the communication device 925 is a network connected via a wire or wirelessly, and it is, for example, the Internet, a LAN for home, an infrared communication, a radio wave communication, or a satellite communication.

The imaging device 933 is a device that captures the actual space and generates a captured image by using an imaging device, such as a CCD (Charge Coupled Device) or a CMOS (Complementary Metal Oxide Semiconductor), and various members, such as a lens, for controlling the focus of an object image onto the imaging device. The imaging device 933 may capture a still image or capture a moving image.

The sensor 935 is various sensors, such as a distance measuring sensor, an acceleration sensor, a gyroscope, a geomagnetic sensor, an oscillation sensor, an optical sensor, or an acoustic sensor. The sensor 935 acquires the information about the state of the information processing apparatus 10, such as the attitude of the chassis of the information processing apparatus 10, or the information about the surrounding environment of the information processing apparatus 10, such as the brightness or the noise around the information processing apparatus 10. Furthermore, the sensor 935 may include a GPS sensor that receive GPS (Global Positioning System) signals and measures the latitude, the longitude, and the altitude of the device.

3. CONCLUSION

As described above, the embodiment of the present disclosure provides the information processing apparatus including the control unit that generates, from the first key with which the first data is decodable, a plurality of shares based on the first key in response to the first-key generation request, restores the first key from the shares based on the first key in response to a second-key generation request, encrypts, with the first key, a part of a plurality of shares based on a part or all of the first key as a second key with which the second data is decodable, and generates a plurality of shares based on the second key.

With this configuration, it is possible to perform the flexible access control to permit the decoding of secret information exclusively with a specific user in a case where secret splitting is hierarchially executed.

Although the preferred embodiment of the present disclosure has been described above in detail with reference to the accompanying drawings, the technical range of the present disclosure is not limited to this example. It is obvious that a person skilled in the art according to the present disclosure may arrive at various modification examples and correction examples within the scope of the technical idea described in claims and it is obviously understood that they also belong to the technical range of the present disclosure.

For example, it is possible to generate a program with which the hardware, such as the CPU, the ROM, and the RAM, built in the computer performs the same function as the function of the above-described control unit 110. Furthermore, it is possible to provide a recording medium having the program recorded therein and readable by the computer.

Furthermore, the advantage mentioned in this description is merely for purposes of explanation or illustration and not limitation. That is, together with the above-described advantage or instead of the above-described advantage, the technology according to the present disclosure may produce other advantages that are obvious to a person skilled in the art from this description.

Furthermore, the configuration described below also belongs to the technical range of the present disclosure.

(1)

An information processing apparatus comprising a control unit that generates, from a first key with which first data is decodable, a plurality of shares based on the first key in response to a first-key generation request, restores the first key from the shares based on the first key in response to a second-key generation request, encrypts, with the first key, a part of a plurality of shares based on a part or all of the first key as a second key with which second data is decodable, and generates a plurality of shares based on the second key.

(2)

The information processing apparatus according to (1), wherein the control unit controls a communication unit so as to transmit a part of the shares based on the first key to a first information provision device in response to the first-key generation request and acquires a part of the shares based on the first key from the first information provision device in response to the second-key generation request.

(3)

The information processing apparatus according to (2), wherein the control unit controls the communication unit so as to transmit another part of the shares based on the first key to a second information provision device in response to the first-key generation request and acquires the another part from the second information provision device in response to the second-key generation request.

(4)

The information processing apparatus according to (1), wherein the control unit controls a communication unit so as to transmit a part of the shares based on the second key to a first information provision device in response to the second-key generation request.

(5)

The information processing apparatus according to (4), wherein the control unit controls the communication unit so as to transmit another part of the shares based on the second key to a second information provision device in response to the second-key generation request.

(6)

The information processing apparatus according to (1), wherein the control unit controls a communication unit so as to transmit another part of the shares based on the part or all of the first key to a first information provision device.

(7)

The information processing apparatus according to any one of (1) to (6), wherein, in response to a first encryption request, the control unit acquires a part of the shares based on the first key, acquires another part of the shares based on the first key, restores the first key based on the part and the another part of the shares based on the first key, and encrypts the first data with the first key.

(8)

The information processing apparatus according to (7), wherein the control unit restores the first key and decodes the first data with the first key in response to a first decoding request.

(9)

The information processing apparatus according to any one of (1) to (8), wherein, in response to a second encryption request, the control unit acquires a part of the shares based on the second key, acquires another part of the shares based on the second key, restores the second key based on the part and the another part of the shares based on the second key, and encrypts the second data with the second key.

(10)

The information processing apparatus according to (9), wherein the control unit restores the second key and decodes the second data with the second key in response to a second decoding request.

(11)

The information processing apparatus according to (1), wherein, in response to a third-key generation request, the control unit restores the first key from the shares based on the first key, encrypts, with the first key, a part of the shares based on the part or all of the first key as a third key, and generates a plurality of shares based on the third key.

(12)

The information processing apparatus according to (11), wherein the control unit controls a communication unit so as to transmit a part of the shares based on the third key to an information provision device in response to the third-key generation request.

(13)

The information processing apparatus according to (12), wherein the control unit controls the communication unit so as to transmit another part of the shares based on the third key in response to the third-key generation request.

(14)

The information processing apparatus according to any one of (11) to (13), wherein, in response to a third decoding request, the control unit restores the third key, restores the first key based on the third key, restores the second key based on the first key, and decodes the second data with the second key.

(15)

The information processing apparatus according to (14), wherein, in response to the third decoding request, the control unit acquires a part of the shares based on the third key, acquires another part of the shares based on the third key, and restores the third key based on the part and the another part of the shares based on the third key.

(16)

The information processing apparatus according to (14) or (15), wherein the control unit acquires another part of the shares based on the part or all of the first key and restores the first key based on the another part and the third key.

(17)

The information processing apparatus according to any one of (11) to (16), wherein the control unit performs control as to whether at least any one of the first key and the second key is to be restored based on access control information.

(18)

The information processing apparatus according to (1), wherein the control unit performs control as to whether at least any one of the first data and the second data is to be decoded based on access control information.

(19)

An information processing method comprising: generating, from a first key with which first data is decodable, a plurality of shares based on the first key in response to a first-key generation request, restoring the first key from the shares based on the first key in response to a second-key generation request, encrypting, with the first key, a part of a plurality of shares based on a part or all of the first key as a second key with which second data is decodable, and generating a plurality of shares based on the second key.

(20)

A program causing a computer to function as an information processing apparatus comprising a control unit that generates, from a first key with which first data is decodable, a plurality of shares based on the first key in response to a first-key generation request, restores the first key from the shares based on the first key in response to a second-key generation request, encrypts, with the first key, a part of a plurality of shares based on a part or all of the first key as a second key with which second data is decodable, and generates a plurality of shares based on the second key.

REFERENCE SIGNS LIST

1 INFORMATION PROCESSING SYSTEM
10 SERVER (INFORMATION PROCESSING APPARATUS)
20-1 FATHER TERMINAL (PERSONAL TERMINAL)
20-2 MOTHER TERMINAL (PERSONAL TERMINAL)
20-3 CHILD TERMINAL (PERSONAL TERMINAL)
30 HOME AGENT
40 AGENT SERVER
50 CLOUD STORAGE
60 ID PROVIDER
70 NETWORK
110 CONTROL UNIT
140 COMMUNICATION UNIT
150 STORAGE UNIT
M0 FAMILY DOMAIN
M1 FATHER DOMAIN
M2 MOTHER DOMAIN
M3 CHILD DOMAIN

The invention claimed is:

1. An information processing apparatus, comprising:
Central Processing Unit (CPU) configured to:
    control reception of a first-key generation request from a first information provision device;
    generate a first key based on the reception of the first-key generation request, wherein first data is decodable based on the first key;
    split the first key to generate a first plurality of shares based on the first key, wherein the first plurality of shares of the first key includes at least a first part and a second part;
    split the second part of the first plurality of shares of the first key to generate a second plurality of shares of the second part;
    control reception of a second-key generation request from the first information provision device, wherein the second-key generation request includes the first part of the first plurality of shares of the first key;
    control acquisition of the second part of the first plurality of shares of the first key corresponding to the first part of the first plurality of shares of the first key based on the reception of the second-key generation request;

restore the first key based on a combination of the first part of the first plurality of shares of the first key and the second part of the first plurality of shares of the first key;

encrypt, with the first key, one of a first part of a third plurality of shares of the first part of the first key or all of the first key as a second key, wherein second data is decodable based on the second key; and generate a fourth plurality of shares based on the second key.

2. The information processing apparatus according to claim 1, wherein the control unit CPU is further configured to control transmission of the first part of the first plurality of shares of the first key to the first information provision device based on the first-key generation request.

3. The information processing apparatus according to claim 2, wherein the CPU is further configured to:
control transmission of the second part of the first plurality of shares of the first key to a second information provision device based on the first-key generation request; and
control the acquisition of the second part of the first plurality of shares of the first key from the second information provision device based on the reception of the second-key generation request.

4. The information processing apparatus according to claim 1, wherein the CPU is further configured to control transmission of a first part of the fourth plurality of shares of the second key to the first information provision device based on the reception of the second-key generation request.

5. The information processing apparatus according to claim 4, wherein the CPU is further configured to control transmission of a second part of the fourth plurality of shares of the second key to a second information provision device based on the reception of the second-key generation request.

6. The information processing apparatus according to claim 1, wherein the CPU is further configured to control transmission of a second part of the third plurality of shares of the first part of the first key or all of the first key to the first information provision device.

7. The information processing apparatus according to claim 1, wherein, based on a first encryption request, the CPU is further configured to:
control acquisition of the first part of the first plurality of shares of the first key;
control acquisition of the second part of the first plurality of shares of the first key;
restore the first key based on the first part of the first plurality of shares of the first key and the second part of the first plurality of shares of the first key; and
encrypt the first data with the first key.

8. The information processing apparatus according to claim 7, wherein the CPU is further configured to:
restore the first key; and
decode the first data with the first key based on a first decoding request.

9. The information processing apparatus according to claim 1, wherein, based on a second encryption request, the CPU is further configured to:
control acquisition of a first part of the fourth plurality of shares of the second key;
control acquisition of a second part of the fourth plurality of shares of the second key;

restore the second key based on the first part of the fourth plurality of shares of the second key and the second part of the fourth plurality of shares of the second key; and
encrypt the second data with the second key.

10. The information processing apparatus according to claim 9, wherein the CPU is further configured to:
restore the second key; and
decode the second data with the second key based on a second decoding request.

11. The information processing apparatus according to claim 1, wherein, based on a third-key generation request, the CPU is further configured to:
restore the first key from the first plurality of shares of the first key,
encrypt, with the first key, the one of the first part of the third plurality of shares the of the first part of the first key or all of the first key as a third key; and
generate a fifth plurality of shares based on the third key.

12. The information processing apparatus according to claim 11, wherein the CPU is further configured to control transmission of a first part of the fifth plurality of shares of the third key to an information provision device based on the third-key generation request.

13. The information processing apparatus according to claim 12, wherein the CPU is further configured to control transmission of a second part of the fifth plurality of shares of the third key based on the third-key generation request.

14. The information processing apparatus according to claim 11, wherein, based on a third decoding request, the CPU is further configured to:
restore the third key;
restore the first key based on the third key;
restore the second key based on the first key; and
decode the second data with the second key.

15. The information processing apparatus according to claim 14, wherein, based on the third decoding request, the CPU is further configured to:
control acquisition of a first part of the fifth plurality of shares of the third key;
control acquisition of a second part of the fifth plurality of shares of the third key; and
restore the third key based on the first part of the fifth plurality of shares of the third key and the second part of the fifth plurality of shares of the third key.

16. The information processing apparatus according to claim 14, wherein the CPU is further configured to:
control acquisition of the second part of the first plurality of shares of the one of the first part of the first key or all of the first key; and
restore the first key based on the second part of the first plurality of shares of the one of the first part of the first key or all of the first key and the third key.

17. The information processing apparatus according to claim 11, wherein the CPU is further configured to control restore of at least one of the first key and the second key based on access control information.

18. The information processing apparatus according to claim 1, wherein the CPU is further configured to control decode of at least one of the first data and the second data based on access control information.

19. An information processing method, comprising:
controlling reception of a first-key generation request from a first information provision device;
generating a first key based on the reception of the first-key generation request, wherein first data is decodable based on the first key;

splitting the first key to generate a first plurality of shares based on the first key, wherein the first plurality of shares of the first key includes at least a first part and a second part;

splitting the second part of the first plurality of shares of the first key to generate a second plurality of shares of the second part;

controlling reception of a second-key generation request from the first information provision device, wherein the second-key generation request includes the first part of the first plurality of shares of the first key;

controlling acquisition of the second part of the first plurality of shares of the first key corresponding to the first part of the first plurality of shares of the first key based on the reception of the second-key generation request;

restoring the first key based on a combination of the first part of the first plurality of shares of the first key and the second part of the first plurality of shares of the first key;

encrypting, with the first key, one of a first part of a third plurality of shares of the first part of the first key or all of the first key as a second key, wherein second data is decodable based on the second key; and generating a fourth plurality of shares based on the second key.

20. A non-transitory computer-readable medium having stored thereon computer-executable instructions, that when executed by a processor, cause the processor to execute operations, the operations comprising:

controlling reception of a first-key generation request from a first information provision device;

generating a first key based on the reception of the first-key generation request, wherein first data is decodable based on the first key;

splitting the first key to generate a first plurality of shares based on the first key, wherein the first plurality of shares of the first key includes at least a first part and a second part;

splitting the second part of the first plurality of shares of the first key to generate a second plurality of shares of the second part;

controlling reception of a second-key generation request from the first information provision device, wherein the second-key generation request includes the first part of the first plurality of shares of the first key;

controlling acquisition of the second part of the first plurality of shares of the first key corresponding to the first part of the first plurality of shares of the first key based on the reception of the second-key generation request;

restoring the first key based on a combination of the first part of the first plurality of shares of the first key and the second part of the first plurality of shares of the first key;

encrypting, with the first key, one of a first part of a third plurality of shares of the first part of the first key or all of the first key as a second key, wherein second data is decodable based on the second key; and generating a fourth plurality of shares based on the second key.

* * * * *